United States Patent
Maeda et al.

(10) Patent No.: US 7,021,285 B2
(45) Date of Patent: Apr. 4, 2006

(54) CONTROL DEVICE FOR INTERNAL COMBUSTION ENGINE

(75) Inventors: Osamu Maeda, Tokyo (JP); Hitoshi Inoue, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/004,093

(22) Filed: Dec. 6, 2004

(65) Prior Publication Data
US 2006/0021596 A1  Feb. 2, 2006

(30) Foreign Application Priority Data
Jul. 27, 2004 (JP) .............................. 2004-218206

(51) Int. Cl.
*F02P 5/15* (2006.01)
*F02D 43/00* (2006.01)
*F02M 51/00* (2006.01)

(52) U.S. Cl. .................... 123/406.26; 123/406.48; 123/568.11; 123/698; 701/103; 701/108

(58) Field of Classification Search .......... 123/406.26, 123/406.48, 568.11, 696, 698; 701/103–105, 701/108, 110
See application file for complete search history.

(56) References Cited

U.S. PATENT DOCUMENTS

| | | | | |
|---|---|---|---|---|
| 4,448,162 A | * | 5/1984 | Ninomiya et al. ..... | 123/406.23 |
| 4,478,185 A | * | 10/1984 | Obayashi et al. ...... | 123/406.23 |
| 4,913,117 A | * | 4/1990 | Hashimoto et al. ...... | 123/406.3 |
| 5,276,625 A | * | 1/1994 | Nakaniwa .................. | 701/111 |
| 5,448,975 A | * | 9/1995 | Sato ...................... | 123/406.44 |
| 5,692,474 A | | 12/1997 | Yamauchi et al. | |
| 5,758,309 A | | 5/1998 | Satoh | |
| 6,516,772 B1 | * | 2/2003 | Ueno et al. ................. | 123/295 |
| 6,662,782 B1 | * | 12/2003 | Iida et al. ............. | 123/406.47 |
| 2002/0104508 A1 | * | 8/2002 | Atago et al. ................ | 123/295 |

FOREIGN PATENT DOCUMENTS

| | | | |
|---|---|---|---|
| JP | 62-10451 | * | 1/1987 |
| JP | 63-289265 | * | 11/1988 |
| JP | 5-215004 A | | 8/1993 |
| JP | 8-30461 B2 | | 3/1996 |
| JP | 9-96238 A | | 4/1997 |
| JP | 10-30537 | * | 2/1998 |

* cited by examiner

*Primary Examiner*—Hai Huynh
(74) *Attorney, Agent, or Firm*—Sughrue Mion, PLLC

(57) ABSTRACT

A combustion variation value is detected, and a function that uses the detected combustion variation value is added to CVAR(i−1) to obtain CVAR(i); and using the resulting value, an exhaust gas recirculation amount and an ignition timing are obtained. A combustion variation is detected, and if the detected combustion variation value is equal to or greater than a predetermined value, the value of flag is set to be 1, and the exhaust gas recirculation amount and the ignition timing are reset to previous values. If the detected combustion variation value is less than the predetermined value, the value of the flag is set to be zero, and a current combustion variation manipulation correcting amount CVAR(i) is updated. If the value of flag is 1, the process is immediately terminated.

9 Claims, 15 Drawing Sheets

F I G . 6
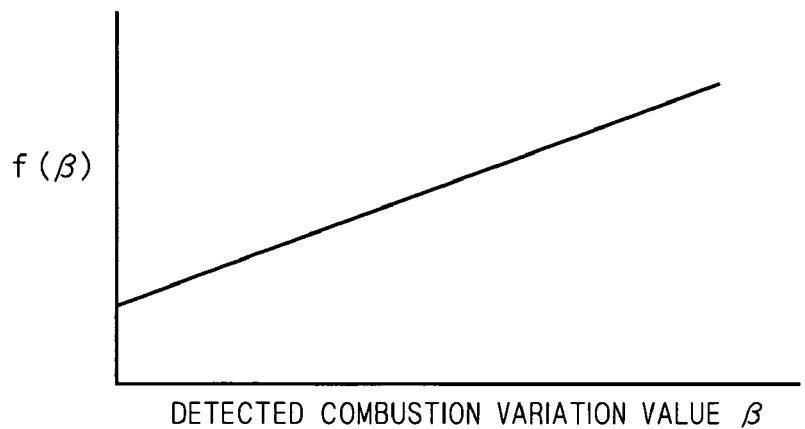

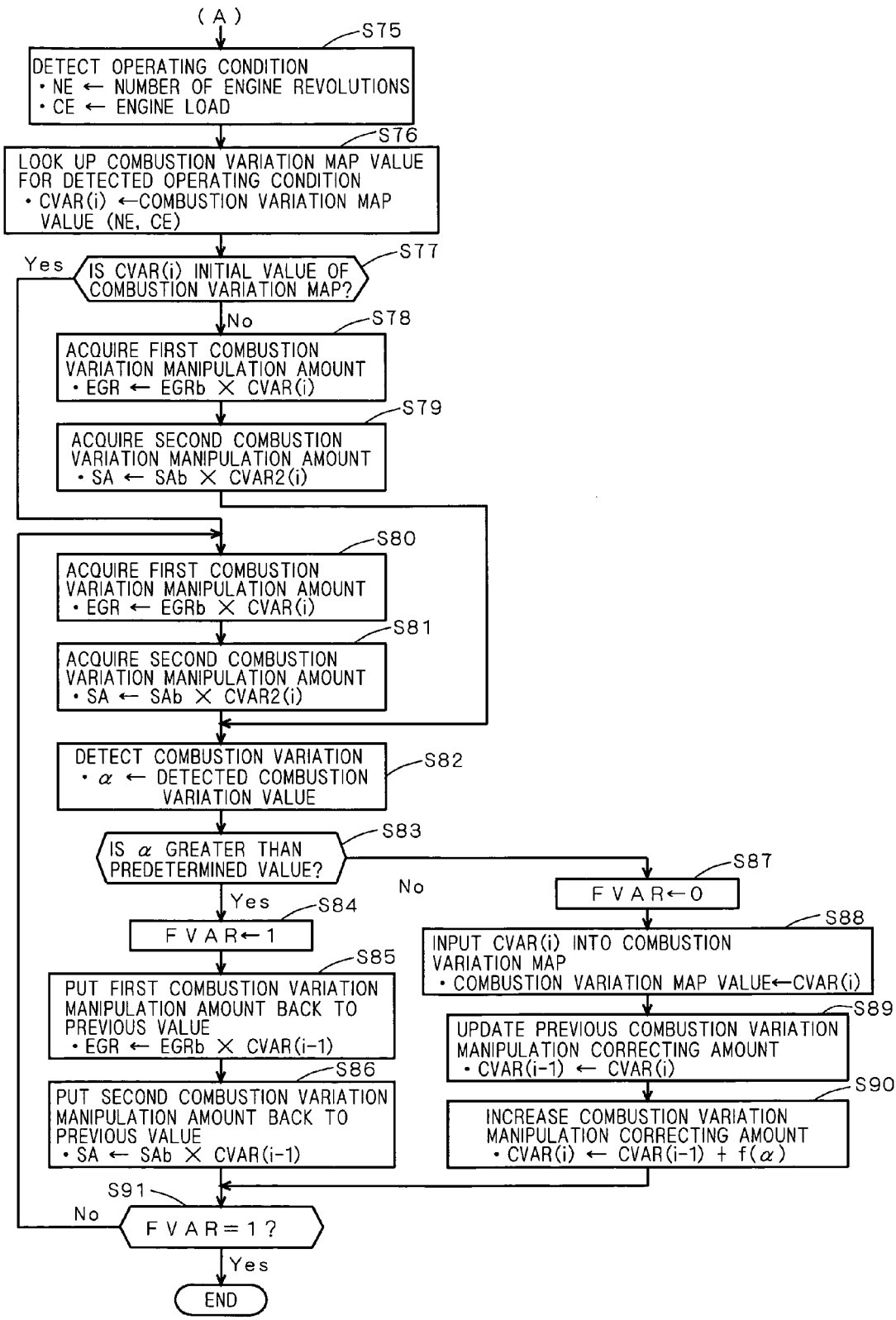

FIG. 12

| | | |
|---|---|---|
| COMBUSTION VARIATION MANIPULATION CORRECTING AMOUNT e = 1 (INITIAL VALUE) | COMBUSTION VARIATION MANIPULATION CORRECTING AMOUNT f = 1 (INITIAL VALUE) | COMBUSTION VARIATION MANIPULATION CORRECTING AMOUNT g = 1 (INITIAL VALUE) |
| COMBUSTION VARIATION MANIPULATION CORRECTING AMOUNT b = 1 (INITIAL VALUE) | COMBUSTION VARIATION MANIPULATION CORRECTING AMOUNT c = 1 (INITIAL VALUE) | COMBUSTION VARIATION MANIPULATION CORRECTING AMOUNT h = 1 (INITIAL VALUE) |
| COMBUSTION VARIATION MANIPULATION CORRECTING AMOUNT a = 1 (INITIAL VALUE) | COMBUSTION VARIATION MANIPULATION CORRECTING AMOUNT d = 1 (INITIAL VALUE) | COMBUSTION VARIATION MANIPULATION CORRECTING AMOUNT i = 1 (INITIAL VALUE) |

ENGINE LOAD (vertical axis, HIGH ↑)
NUMBER OF ENGINE REVOLUTIONS ⟶ HIGH

FIG. 13

| | | |
|---|---|---|
| COMBUSTION VARIATION MANIPULATION CORRECTING AMOUNT e = 1 (INITIAL VALUE) | COMBUSTION VARIATION MANIPULATION CORRECTING AMOUNT f = 1 (INITIAL VALUE) | COMBUSTION VARIATION MANIPULATION CORRECTING AMOUNT g = 1 (INITIAL VALUE) |
| COMBUSTION VARIATION MANIPULATION CORRECTING AMOUNT b = 1 (INITIAL VALUE) | COMBUSTION VARIATION MANIPULATION CORRECTING AMOUNT c = 1 (INITIAL VALUE) | COMBUSTION VARIATION MANIPULATION CORRECTING AMOUNT h = 1 (INITIAL VALUE) |
| COMBUSTION VARIATION MANIPULATION CORRECTING AMOUNT a = X | COMBUSTION VARIATION MANIPULATION CORRECTING AMOUNT d = 1 (INITIAL VALUE) | COMBUSTION VARIATION MANIPULATION CORRECTING AMOUNT i = 1 (INITIAL VALUE) |

ENGINE LOAD (vertical axis, HIGH ↑)
NUMBER OF ENGINE REVOLUTIONS ⟶ HIGH

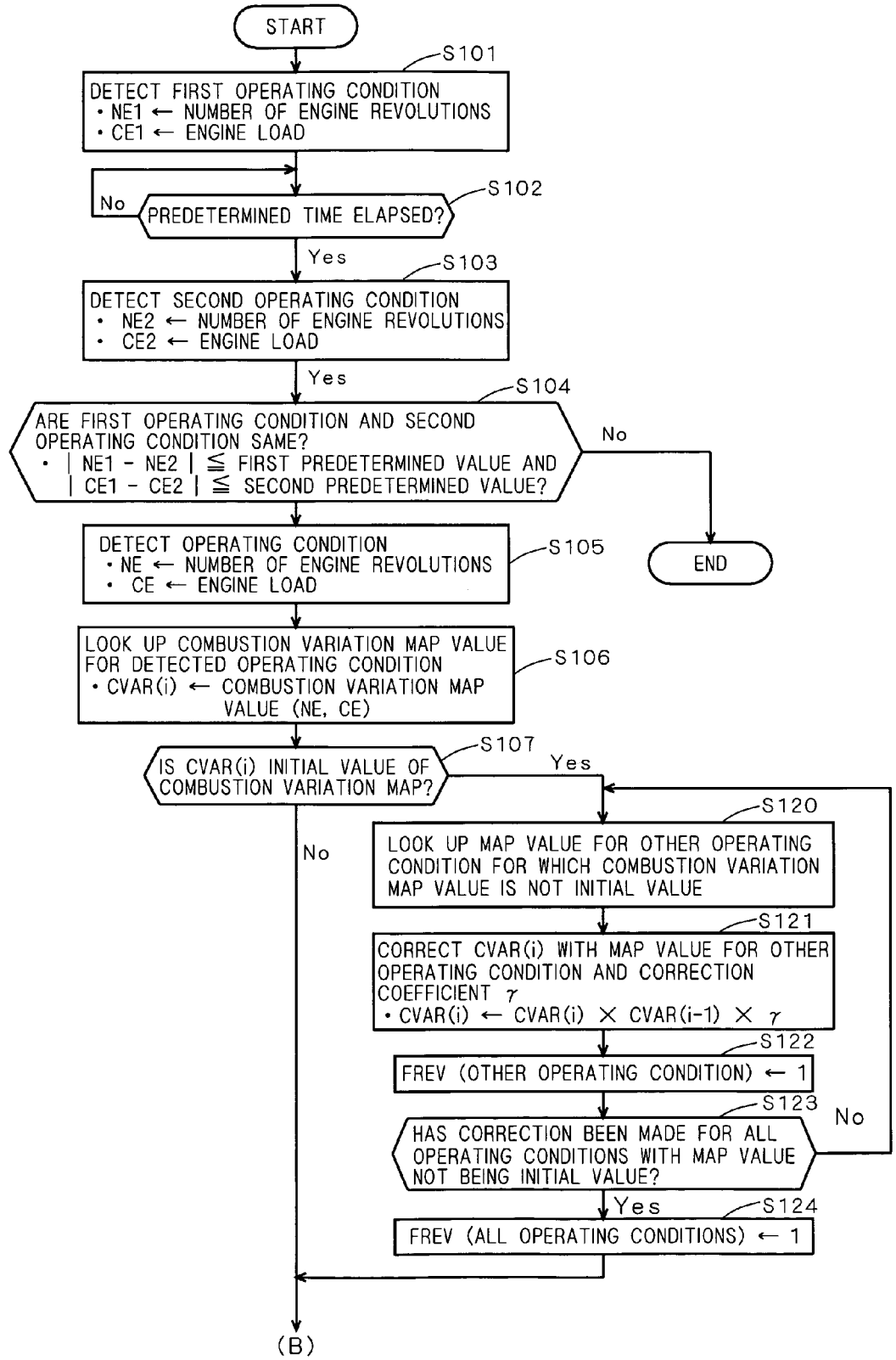

FIG. 16

| | | |
|---|---|---|
| COMBUSTION VARIATION MANIPULATION CORRECTING AMOUNT e = t (NON-INITIAL VALUE) | COMBUSTION VARIATION MANIPULATION CORRECTING AMOUNT f = 1 (INITIAL VALUE) | COMBUSTION VARIATION MANIPULATION CORRECTING AMOUNT g = 1 (INITIAL VALUE) |
| COMBUSTION VARIATION MANIPULATION CORRECTING AMOUNT b = q (NON-INITIAL VALUE) | COMBUSTION VARIATION MANIPULATION CORRECTING AMOUNT c = r (NON-INITIAL VALUE) | COMBUSTION VARIATION MANIPULATION CORRECTING AMOUNT h = 1 (INITIAL VALUE) |
| COMBUSTION VARIATION MANIPULATION CORRECTING AMOUNT a = p (NON-INITIAL VALUE) | COMBUSTION VARIATION MANIPULATION CORRECTING AMOUNT d = s (NON-INITIAL VALUE) | COMBUSTION VARIATION MANIPULATION CORRECTING AMOUNT i = 1 (INITIAL VALUE) |

ENGINE LOAD (vertical axis, HIGH ↑)
NUMBER OF ENGINE REVOLUTIONS ⟶ HIGH

FIG. 17

| | | |
|---|---|---|
| 0 | 0 | 0 |
| 0 | 0 | 0 |
| 1 | 0 | 0 |

ENGINE LOAD (vertical axis, HIGH ↑)
NUMBER OF ENGINE REVOLUTIONS ⟶ HIGH

CONTROL DEVICE FOR INTERNAL COMBUSTION ENGINE

BACKGROUND OF THE INVENTION

1. Field of the Invention

The present invention relates to control devices for internal combustion engines, and more particularly relates to a control device for an internal combustion engine that improves fuel consumption of the internal combustion engine.

2. Description of the Background Art

In an internal combustion engine, exhaust gas recirculation amount, for example, has such a correlation with fuel consumption and combustion variation as follows. As the exhaust gas recirculation amount increases, the fuel consumption of the engine gradually becomes better, and at a certain exhaust gas recirculation amount, a value is reached at which the fuel consumption is minimized (hereafter referred to as a "fuel-consumption optimum value"), and if the exhaust gas recirculation amount is increased further, the fuel consumption worsens. Meanwhile, as the exhaust gas recirculation amount is increased, the combustion condition of the engine gradually becomes smaller, but when it exceeds a certain exhaust gas recirculation amount, a combustion variation abruptly increases, and it exceeds a limit value (hereafter referred to as a "combustion variation limit value") under which the combustion variation can be permitted. Moreover, the fuel-consumption optimum value and the combustion variation limit value are attained at approximately a same exhaust gas recirculation amount.

The correlation of ignition timing with the fuel consumption and the combustion variation also shows a similar correlation to the above-described correlation of the exhaust gas recirculation amount with the fuel consumption and the combustion variation.

The correlation of air-fuel ratio with the fuel consumption and the combustion variation also shows a similar correlation to the above-described correlation of the exhaust gas recirculation amount with the fuel consumption and the combustion variation.

Therefore, it is understood that the fuel consumption will be minimized if manipulation values are set for the exhaust gas recirculation amount, the ignition timing, and the air-fuel ratio such that the combustion variation results in the combustion variation limit value.

However, it is difficult to set such manipulation values for the exhaust gas recirculation amount, the ignition timing, and the air-fuel ratio engine as to obtain the combustion variation limit value taking into account individual variations among internal combustion engines and their degradations over time. For example, if the exhaust gas recirculation amount is set at a manipulation value such as to result in the combustion variation limit value with a certain internal combustion engine, the combustion variation may increase and exceed the combustion variation limit value with another internal combustion engine in the same operating condition, because exactly the same combustion condition will not occur because of their individual variations.

For that reason, those manipulation amounts are allowed to have a certain degree of additional margins (hereafter referred to as "margins"). Nevertheless, by allowing the exhaust gas recirculation amount to have a margin, the fuel consumption becomes greater than the fuel-consumption optimum value.

Likewise, the ignition timing is also allowed to have a margin for the same reason as the exhaust gas recirculation amount, but by allowing the ignition timing to have a margin, the fuel consumption becomes greater than the fuel-consumption optimum value.

Likewise, the air-fuel ratio is also allowed to have a margin for the same reason as the exhaust gas recirculation amount, but by allowing the air-fuel ratio to have a margin, the fuel consumption becomes greater than the fuel-consumption optimum value.

Thus, although the fuel consumption is increased, variations among internal combustion engines and their deteriorations over time are absorbed and an operation with a small combustion variation in the internal combustion engines is ensured by allowing the exhaust gas recirculation amount, the ignition timing, and the air-fuel ratio to have margins.

Nevertheless, improvement in the fuel consumption of internal combustion engines has been demanded increasingly in recent years, and various patent applications have been made.

For example, Japanese Patent Application Laid-open No. 5-215004 (1999) discloses a technique in which, by detecting a combustion variation in an internal combustion engine and increasing the exhaust gas recirculation amount until the detection result is determined to be an abnormal combustion, the combustion condition is controlled to result in the maximum exhaust gas recirculation amount within the combustion variation limit to reduce the amount of the fuel consumption increased due to the margin of the exhaust gas recirculation amount.

In addition, Japanese Patent Publication No. 8-30461 (1999) discloses a technique in which, by detecting knocking in an internal combustion engine and advancing the ignition timing until knocking occurs, the combustion is controlled with the ignition timing of the maximum advance angle at which knocking does not occur to reduce the amount of the fuel consumption increased due to the margin of the ignition timing.

In addition, in Japanese Patent Application Laid-open No. 9-96238 (1999), a technique is disclosed that optimizes engine cylinder internal pressure to improve the fuel consumption by detecting an engine cylinder internal pressure and manipulating the air-fuel ratio and the ignition timing so that the engine cylinder internal pressure is maximized. Moreover, when the combustion temperature of the engine is higher than a predetermined value, the exhaust gas recirculation amount is manipulated to lower the combustion temperature, thus suppressing the emission of $NO_x$, which is one component of exhaust gas.

The technique of Japanese Patent Application Laid-open No. 5-215004 has a problem that although the amount of the fuel consumption increased is reduced by merely increasing the exhaust gas recirculation amount to attain a combustion variation limit value in an exhaust-gas-recirculation-amount increasing direction, the fuel consumption does not reach the real fuel-consumption optimum value and becomes greater than the real fuel-consumption optimum value.

Likewise, the technique of Japanese Patent Publication No. 8-30461 has a problem that although the amount of the fuel consumption increased is reduced by merely advancing the ignition timing to attain a combustion variation limit value in the ignition timing advancing direction, the fuel consumption does not reach a real fuel-consumption optimum value and becomes greater than the real fuel-consumption optimum value.

Further, in Japanese Patent Application Laid-open No. 9-96238, the fuel consumption is improved by advancing ignition timing and moreover $NO_x$ is suppressed by increasing the exhaust gas recirculation amount when the combustion temperature is higher than a predetermined value. However, there is another problem that when the combustion temperature is less than the predetermined value, the exhaust gas recirculation amount is not manipulated in the increasing direction, so the fuel consumption does not reach the real fuel-consumption optimum value and becomes greater than the real fuel-consumption optimum value.

Another problem has been that the fuel-consumption optimum value cannot be reached quickly when the combustion temperature is higher than a predetermined value.

SUMMARY OF THE INVENTION

Accordingly, it is an object of the invention to prevent the increase in the fuel consumption caused by allowing the exhaust gas recirculation amount, the ignition timing, and the air-fuel ratio to have margins in order to absorb variations among internal combustion engines and their deterioration over time.

In accordance with the present invention, a control device for an internal combustion engine includes a combustion variation detecting section, a computing section, a combustion variation determining section, a combustion-variation-manipulation-correcting-amount changing section, and a combustion variation manipulating section.

The combustion variation detecting section detects a combustion variation in the internal combustion engine and digitizing it as a combustion variation value. The computing section calculates a combustion variation manipulation amount for manipulating the combustion variation in the internal combustion engine based on a combustion variation manipulation correcting amount. The combustion variation determining section determines a combustion variation state in the internal combustion engine based on the combustion variation value. The combustion-variation-manipulation-correcting-amount changing section changes the combustion variation manipulation correcting amount based on a result of the determination in the combustion variation determining section. The combustion variation manipulating section manipulates the combustion variation of the internal combustion engine based on the combustion variation manipulation amount. The combustion variation manipulation correcting amount is changed by degrees in the combustion-variation-manipulation-correcting-amount changing section until a determination result in the combustion variation determining section becomes a predetermined determination result.

With the above-described control device for an internal combustion engine, a combustion variation in the internal combustion engine is detected, a combustion variation manipulation amount is changed according to the combustion variation, and a combustion variation manipulation correcting amount is changed in a step-by-step manner until the combustion variation state becomes a predetermined state; therefore, it is possible to reduce the margins provided for the combustion variation manipulation amounts and to obtain a fuel-consumption optimum value within the combustion variation limit value without being affected by variations among internal combustion engines and their deteriorations over time.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a graph showing the relationship between detected combustion variation value $\beta$ and $f(\beta)$;

FIG. 11 is a flowchart illustrating a control operation of a control device for an internal combustion engine according to a fifth preferred embodiment of the present invention;

FIG. 12 is a conceptual view for illustrating a combustion variation map;

FIG. 13 is a view for illustrating one example of rewriting a combustion variation map;

FIG. 14 is a flowchart illustrating a control operation of a control device for an internal combustion engine according to a sixth preferred embodiment of the present invention;

FIG. 16 is a view showing one example of combustion variation map that stores combustion variation manipulation correcting amounts in addition to initial values;

FIG. 17 is a view showing flag values for respective operating conditions in a combustion variation map.

DESCRIPTION OF THE PREFERRED EMBODIMENTS

<Overall Configuration of Internal Combustion Engine and Control Device Therefor>

Prior to the explanation of preferred embodiments, the overall configuration of an internal combustion engine (hereinafter referred to as an "engine") and a control device therefor, which are common to all the preferred embodiments, are explained with reference to FIG. 1.

Figure 1:
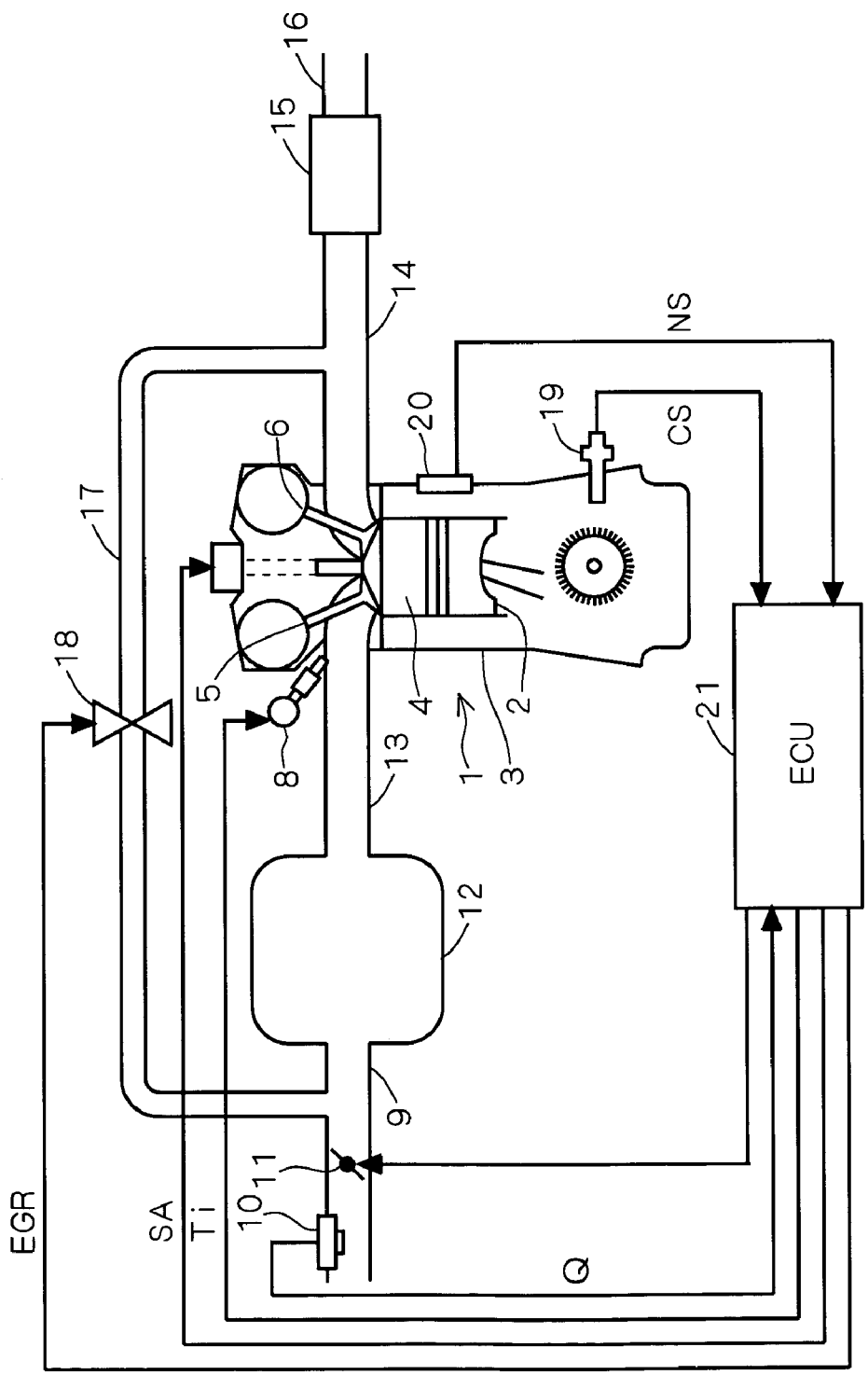
FIG. 1 is a diagram showing the overall configuration of an internal combustion engine and a control device for an internal combustion engine according to the present invention.

Referring to FIG. 1, an engine 1 is furnished with a combustion chamber 4 that is primarily composed of a piston 2 and a cylinder 3, and the combustion chamber 4 is furnished with an air intake valve 5, an exhaust valve 6, and a spark plug 7.

The air intake valve 5 is disposed so that it can open/close the open end of an air intake port 13 that is on the cylinder 3 side, and on the air intake port 13 that is near the air intake valve 5, a fuel injection valve 8 for weighing and injecting fuel is disposed so that fuel can be supplied into each cylinder with optimum timing.

The movement of an acceleration pedal (not shown) is input to an electronic control unit (hereinafter referred to as an "ECU") 21 for controlling an engine, and according to the depressed amount of the acceleration pedal that is computed therein, the degree of opening of a throttle valve 11 provided in an air intake manifold 9 is controlled; thus, intake air flows into the combustion chamber 4 via a surge tank 12 and the air intake port 13.

An air intake amount (amount of the air taken in) is used for computing the load to the engine 1 by inputting a signal of an air flow meter 10 disposed upstream of the throttle valve 11 in the air intake manifold 9 into the ECU 21 (control device for an internal combustion engine).

A crank shaft of the engine 1 is provided with a crank angle sensor 19, and a crank angle signal CS is input to the ECU 21 to calculate a number of engine revolutions. Further, the engine 1 is provided with a knock sensor 20, and a knock sensor signal NS is input to the ECU 21 to detect a combustion variation based on the signal.

The exhaust valve 6 is disposed so that it can open/close the open end of an exhaust manifold 14 that is on the cylinder 3 side. The exhaust gas emitted from the engine 1 is discharged from a tailpipe 16 via a catalyst system 15 disposed at the terminal end of the exhaust manifold 14 to the atmosphere, and the ECU 21 controls an exhaust gas recirculation valve 18 provided on an exhaust gas recirculation path 17 that connects the exhaust manifold 14 and the air intake manifold 9, thereby recirculating a predetermined amount of exhaust gas into the air intake manifold 9.

It should be noted that the ECU 21 has a combustion variation detecting section, a combustion variation determining section, a computing section, a combustion-variation-manipulation-correcting-amount changing section, a combustion variation manipulating section, an operating condition-determining section, and an operating condition-reflecting correcting section, and the functions of these components will be described in the following when necessary.

A. First Preferred Embodiment

A first preferred embodiment of the present invention is described with reference to FIGS. 2 to 4.

Figure 2:
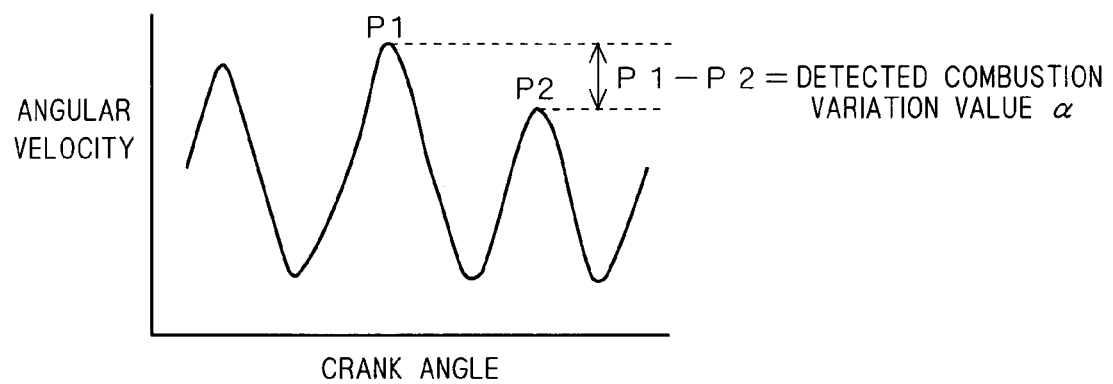
FIG. 2 is a graph illustrating a method of detecting combustion variation from rotational angular velocity of a crank.

First, with reference to FIG. 1, the relationship between a basic control operation for the engine 1 with the ECU 21 and a control operation in the present preferred embodiment is discussed using FIG. 2.

<A-1. Control Operation with ECU>

<A-1-1. Control of Exhaust Gas Recirculation Amount>

An exhaust gas recirculation amount of the exhaust gas recirculation valve 18, which constitutes a portion of the combustion variation manipulating section, is controlled as follows.

The ECU 21 computes a base exhaust gas recirculation amount EGRb based on an air intake amount Q detected by the air flow meter 10 and a number of engine revolutions NE calculated from a signal CS from the crank angle sensor 19.

In the present preferred embodiment, the base exhaust gas recirculation amount EGRb is corrected according to a combustion variation to obtain a final exhaust gas recirculation amount EGR, so that the exhaust gas recirculation valve 18 supplies the exhaust gas recirculation amount EGR.

<A-1-2. Control of Ignition Timing>

Ignition timing with the spark plug 7, which constitutes a portion of the combustion variation manipulating section, is controlled as follows.

The ECU 21 computes a base ignition timing SAb based on an air intake amount Q detected by the air flow meter 10 and a number of engine revolutions NE calculated from the signal CS from the crank angle sensor 19.

In the present preferred embodiment, the base ignition timing SAb is corrected according to a combustion variation to obtain a final ignition timing SA.

<A-1-3. Control of Fuel Injection Amount>

An injection amount with the fuel injection valve 8, which constitutes a portion of the combustion variation manipulating section, is controlled as follows.

The ECU 21 computes a base air-fuel ratio AFb (=the weight of air/the weight of fuel) based on an air intake amount Q detected by the air flow meter 10 and an engine revolution NE calculated from the signal CS from the crank angle sensor 19.

In the present preferred embodiment, a base fuel injection amount Tp (=K×Q/NE: K is a constant) is calculated, which corresponds to a final air-fuel ratio AF obtained by correcting the base air-fuel ratio AFb according to a combustion variation, and is corrected according to operating conditions such as a coolant temperature Tw to obtain a final fuel injection amount Ti, and the fuel injection valve 8 supplies the amount of fuel that is proportionate to the fuel injection amount Ti by injection.

<A-1-4. Combustion Variation Detecting Operation>

The ECU 21 has a combustion variation detecting section for detecting a combustion variation, and its combustion variation detecting operation is carried out as follows.

For example, in the case where a variation in number of revolutions is detected as the combustion variation using the crank angle sensor 19, the angular velocity of a predetermined crank angle is firstly calculated each time the crank angle sensor 19 detects the predetermined crank angle.

FIG. 2 shows a relationship between crank angles and angular velocities. As shown in FIG. 2, the relationship between crank angles and angular velocities shows a profile similar to a sine curve; however, because the angular velocity changes according to the combustion condition in the combustion chamber 4, different angular velocities are brought about, for example, at a vertex P1 and a vertex P2, which are at the same crank angle, on the curve shown in FIG. 2, resulting in different vertex heights. This height difference (P1–P2) between the vertexes, that is, the amount of the variation in the angular velocities, is defined as detected combustion variation value α.

It should be noted that combustion variations can be detected also with a knock sensor signal, an air-fuel ratio sensor signal, a cylinder internal pressure sensor signal, an ion current sensor signal, an exhaust gas component concentration sensor signal, and so forth, by calculating the amount of variation of the signals.

By detecting a combustion variation using the above-described variation in number of revolutions or a variation amount in various signals, the combustion variation in an internal combustion engine can be found accurately.

<A-1-5. Combustion Variation Determining Operation>

The ECU 21 has a combustion variation determining section for determining a combustion variation, and the combustion variation determining operation therein is carried out as follows.

For example, when the combustion variation detecting operation is carried out based on a variation in number of revolutions using the crank angle sensor 19, a certain value of the variation in number of revolutions is set as an arbitrary threshold value, and the determination is made according to whether or not it is equal to or greater than the threshold value.

Likewise, in cases where the combustion variation detecting operation is carried out using a knock sensor signal, an air-fuel ratio sensor signal, a cylinder internal pressure sensor signal, an ion current sensor signal, an exhaust-gas-component-concentration sensor signal, and so forth, a predetermined amount of variation in each sensor signal is set as an arbitrary threshold value, and the determination is made according to whether or not the amount of variation in each of the sensor signals is equal to or higher than the threshold value.

<A-2. Fuel Consumption Optimization Control>

Figure 3:
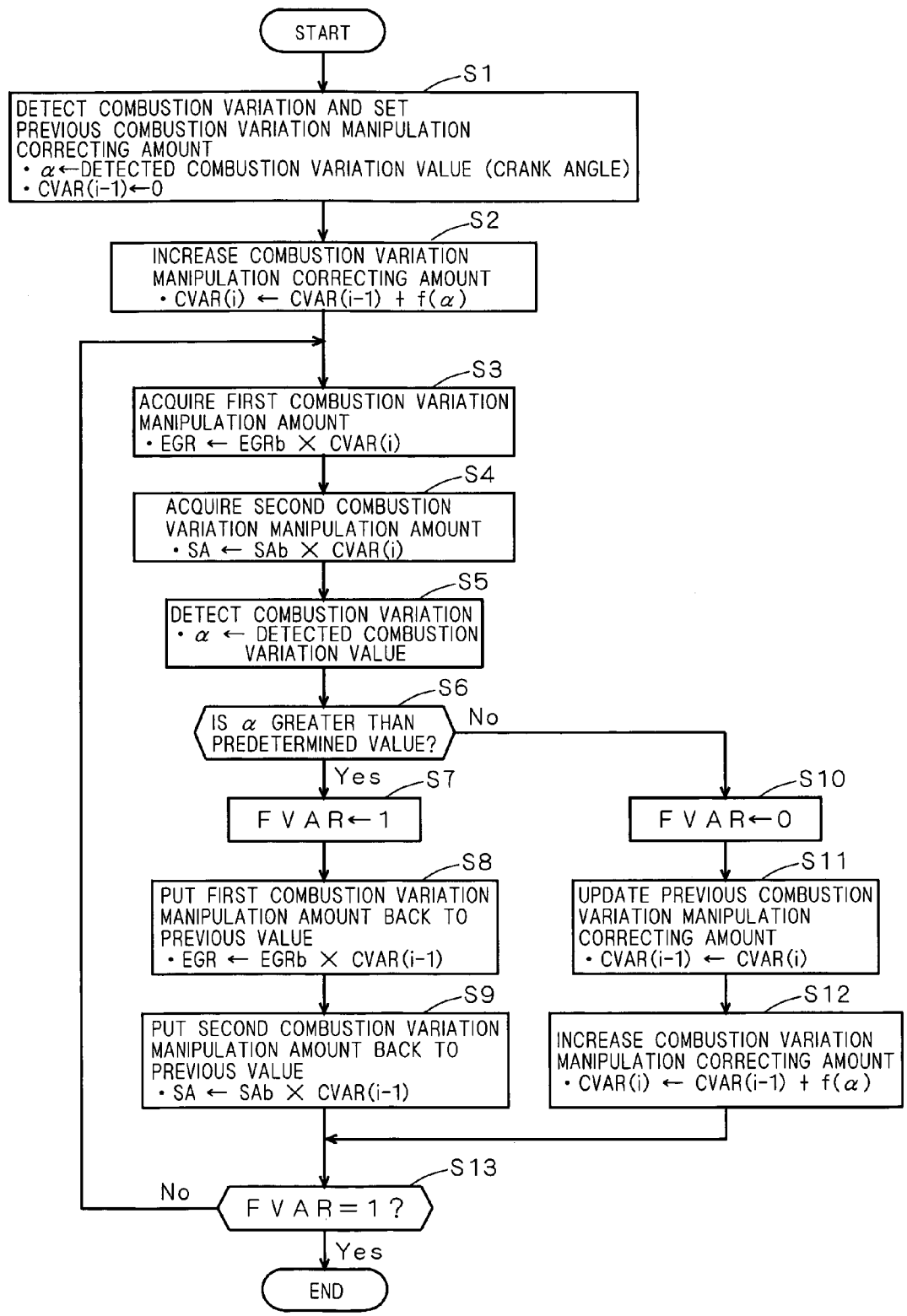
FIG. 3 is a flowchart illustrating a control operation of a control device for an internal combustion engine according to a first preferred embodiment of the present invention.

Next, with reference to FIG. 1, a fuel consumption optimization control by the ECU 21 is described referring to the flowchart shown in FIG. 3 as a first preferred embodiment according to the present invention. It should be noted that the process operation shown in FIG. 3 is executed repeatedly at each predetermined time (for example, each 10 msec.).

Upon starting the process operation, the combustion variation detecting section performs the following operation; in step S1 shown in FIG. 3, the angular velocity at a predetermined crank angle that has been specified in advance is calculated based on a crank-angle signal CS that is output from the crank angle sensor 19, and an amount of variation of the angular velocity is stored in a memory or the like in the ECU 21, as a detected combustion variation value $\alpha$.

Meanwhile, a set value 0 is stored as an initial value for a previous value of the combustion variation manipulation correcting amount CVAR(i−1).

Next, the computing section performs the following operation; in step S2, the previous combustion variation manipulation correcting amount CVAR(i−1) stored at step S1 is added to a function $f(\alpha)$ that uses a detected combustion variation value $\alpha$, and thereby, a combustion variation manipulation correcting amount CVAR (i) represented by the following equation (1) is obtained.

$$CVAR(i)=CVAR(i-1)+f(\alpha) \quad (1)$$

Figure 4:
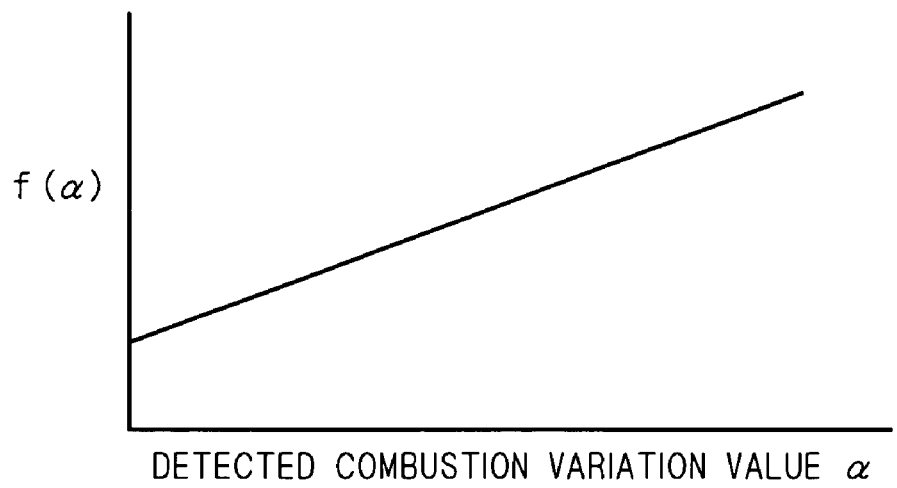
FIG. 4 is a graph showing the relationship between detected combustion variation value $\alpha$ and $f(\alpha)$.

Here, the function $f(\alpha)$ of detected combustion variation value $\alpha$ is expressed, for example, as a linear function as shown in FIG. 4, so $f(\alpha)$ can be uniquely obtained from a value of detected combustion variation values $\alpha$. It should be noted that in FIG. 4, the horizontal axis represents detected combustion variation values $\alpha$ and the vertical axis represents $f(\alpha)$.

Now, FIG. 3 will be discussed again.

Next, the computing section performs the following operation; in step S3, the base exhaust gas recirculation amount EGRb is corrected using a combustion variation manipulation correcting amount CVAR(i) obtained in step S2 or the later-described step S12 to obtain an exhaust gas recirculation amount EGR that serves as a first combustion variation manipulation amount.

The exhaust gas recirculation amount EGR is obtained using the following equation (2) so as to be greater than the base exhaust gas recirculation amount EGRb, and the exhaust gas that is specified by the exhaust gas recirculation amount EGR flows into the air intake manifold 9.

$$EGR=EGRb \times CVAR(i) \quad (2)$$

Next, in step S4, the base ignition timing SAb is corrected using a combustion variation manipulation correcting amount CVAR(i) obtained in step S2 or the later-described step S12 to obtain an ignition timing SA that serves as a second combustion variation manipulation amount.

The ignition timing SA is obtained using the following equation (3) so as to be advanced further forward than the base ignition timing SAb, and the spark plug 7 carries out ignition at the time specified by the ignition timing SA.

$$SA=SAb \times CVAR(i) \quad (3)$$

Next, in step S5, a combustion variation is detected from the increase of the exhaust gas recirculation amount EGR and the advancement of the ignition timing SA, and a detected value is stored in a memory or the like in the ECU 21 as a detected combustion variation value $\alpha$.

Next, in step S6, it is determined whether or not the detected combustion variation value $\alpha$ acquired in step S5 is equal to or greater than a predetermined value that has been specified in advance, that is, whether or not the current combustion variation exceeds a permissible range.

If the result of the determination in step S6 is positive (yes), it means the condition is such that the combustion variation has exceeded the permissible range (reached the combustion variation limit value) because of the increase of the exhaust gas recirculation amount EGR and the advancement of the ignition timing SA, and the value of the flag FVAR is set to be 1 in order to store that condition (step S7).

Then, in step S8, in order to put the exhaust gas recirculation amount EGR back to a previous value that has not reached the combustion variation limit value, the base exhaust gas recirculation amount EGRb is corrected using the previous combustion variation manipulation correcting amount CVAR(i−1) so that the exhaust gas recirculation amount EGR falls within the permissible range of the combustion variation.

The correction of the exhaust gas recirculation amount EGR is performed using the following equation (4).

$$EGR=EGRb \times CVAR(i-1) \quad (4)$$

Likewise, in step S9, in order to put the ignition timing SA back to a previous value that has not reached the combustion variation limit value, the base ignition timing SAb is corrected using the previous combustion variation manipulation correcting amount CVAR(i−1) so that the ignition timing SA falls within the permissible range of the combustion variation.

The correction of the ignition timing SA is performed using the following equation (5).

$$SA=SAb \times CVAR(i-1) \quad (5)$$

The order of steps S8 and S9 is not limited to that described above; after completing steps S8 and S9, the process proceeds to step S13.

On the other hand, if the result of the determination in step S6 is negative (no), it means that the exhaust gas recirculation amount EGR and the ignition timing SA are in such a condition that the combustion variation does not exceed the maximum value within the permissible range, and the value of the flag FVAR is set to be 0 in order to store that condition (step S10).

Then, in the combustion-variation-manipulation-correcting-amount changing section, in order to update the current combustion variation manipulation correcting amount CVAR(i), in step S11, the current combustion variation manipulation correcting amount CVAR(i) is firstly stored in a memory or the like in the ECU 21 as a new previous combustion variation manipulation correcting amount CVAR(i−1).

Subsequently, the function f(α) that uses the detected combustion variation value α that has been stored at the step S5 is added to the new previous combustion variation manipulation correcting amount CVAR(i−1) stored at step S11 to thereby obtain a new combustion variation manipulation correcting amount CVAR(i) (step S12), and the process proceeds to step S13.

In step S13, it is determined whether or not the value of the flag FVAR is 1, that is, whether or not the condition is such that the combustion variation exceeds the permissible range by both increasing the exhaust gas recirculation amount EGR and advancing the ignition timing SA.

Then, if the result of the determination in step S13 is positive (yes), it is determined that the fuel consumption with the exhaust gas recirculation amount EGR, which is the first combustion variation manipulation amount, and with the ignition timing SA, which is the second combustion variation manipulation amount, has reached the fuel-consumption optimum value, and the process is terminated immediately.

On the other hand, if the result of the determination in step S13 is negative (no), it is determined that the fuel consumption has not yet reached the fuel-consumption optimum value, and the process that follows step S3 is repeated.

<A-3. Advantageous Effects>

As described above, according to the fuel consumption optimization control of the first preferred embodiment, the exhaust gas recirculation amount is increased and the ignition timing is advanced in combination according to the detected combustion variation value based on the correlation between the exhaust gas recirculation amount and the ignition timing, to realize the maximum exhaust gas recirculation amount and the maximum ignition timing advancement within combustion variation limit values; as a consequence, the manipulation amounts can be set at the fuel-consumption optimum values that exist in the exhaust-gas-recirculation-amount increasing direction and in the ignition timing advancing direction, and the fuel consumption can be improved.

B. Second Preferred Embodiment

A second preferred embodiment according to the present invention is described with reference to FIGS. 5 and 6.

The first preferred embodiment has described an example in which as a detection value for combustion variation, the amount of variation of the crank angular velocity is used as a detected combustion variation value α. The second preferred embodiment will describe a configuration in which a fuel consumption optimization control is carried out using a detected combustion variation value β, which is calculated based on a knock sensor signal NS that the knock sensor 20 (see FIG. 1) outputs, in combination with the detected combustion variation value α.

<B-1. Fuel Consumption Optimization Control>

Figure 5:
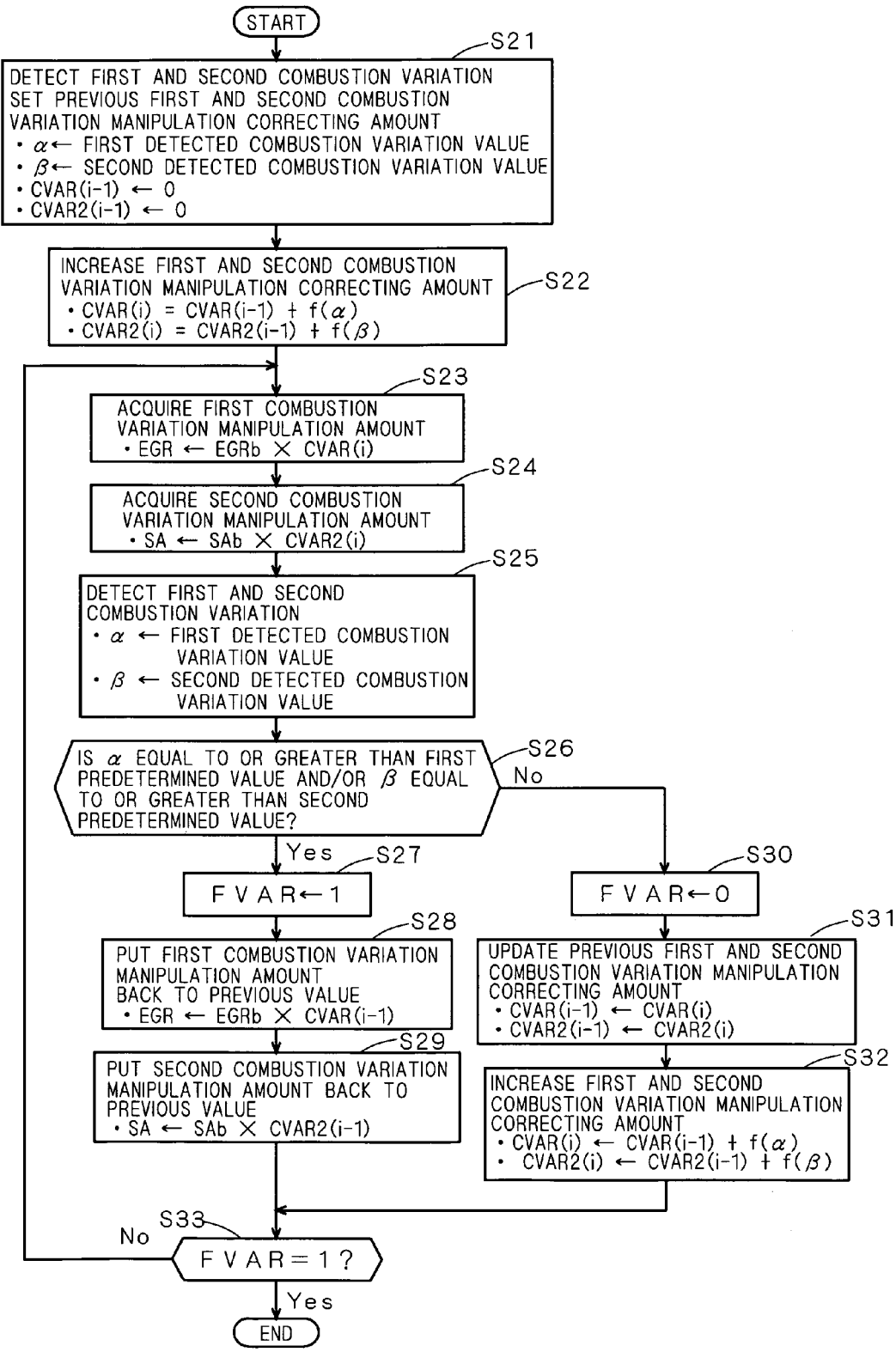
FIG. 5 is a flowchart illustrating a control operation of a control device for an internal combustion engine according to a second preferred embodiment of the present invention.

With reference to FIG. 1, a fuel consumption optimization control by the ECU 21 is described referring to the flowchart shown in FIG. 5. It should be noted that the process operation shown in FIG. 5 is executed repeatedly at each predetermined time (for example, each 10 msec.).

Upon starting the process operation, in step S21 shown in FIG. 5, the angular velocity at a predetermined crank angle that has been specified in advance is calculated based on a crank-angle signal CS that is output from the crank angle sensor 19, and an amount of variation of the angular velocity is stored in a memory or the like in the ECU 21, as a first detected combustion variation value α.

In addition, the average value of the number of times of knocking within a predetermined duration that has been specified in advance is calculated based on a knock sensor signal NS output from the knock sensor 20, and the amount of variation between the resulting average value and a previous average value of the number of times of knocking (for example, during the fuel consumption optimization control carried out 10 msec. before) is stored in a memory or the like in the ECU 21 as a second detected combustion variation value β.

It should be noted that a set value 0 is stored as the initial value of a previous first combustion variation manipulation correcting amount CVAR(i−1) and a set value 0 is stored as the initial value of a previous second combustion variation manipulation correcting amount CVAR2(i−1).

Next, in step S22, by adding the previous value of the first combustion variation manipulation correcting amount CVAR(i−1) stored at step S21 and the function f(α) that uses the first detected combustion variation value α, a first combustion variation manipulation correcting amount CVAR(i) expressed by the previously-shown equation (1) is obtained.

Likewise, by adding the previous value of the second combustion variation manipulation correcting amount CVAR2(i−1) stored at step S21 and the function f(β) that uses the second detected combustion variation value β, a second combustion variation manipulation correcting amount CVAR2(i) represented by the following equation (6) is obtained.

$$CVAR2(i)=CVAR2(i-1)+f(\beta) \qquad (6)$$

Here, the function f(β) of second detected combustion variation values β is expressed as a linear function, for example, as shown in FIG. 6, and f(β) can be obtained uniquely from a value of second detected combustion variation values β. It should be noted that in FIG. 6, the horizontal axis represents detected combustion variation values β and the vertical axis represents f(β).

Now, the description of FIG. 5 will be given again.

Next, in step S23, the base exhaust gas recirculation amount EGRb is corrected using the first combustion variation manipulation correcting amount CVAR(i) obtained in step S22 or the later-described step S32 to obtain an exhaust gas recirculation amount EGR that serves as a first combustion variation manipulation amount.

The exhaust gas recirculation amount EGR is obtained using the previously-shown equation (2) so as to be greater than the base exhaust gas recirculation amount EGRb, and the exhaust gas that is specified by the exhaust gas recirculation amount EGR flows into the air intake manifold 9.

Next, in step S24, the base ignition timing SAb is corrected using the second combustion variation manipulation correcting amount CVAR2(i) obtained in step S22 or the later-described step S32 to obtain an ignition timing SA that serves as the second combustion variation manipulation amount.

The ignition timing SA is corrected using the following equation (7) so as to be advanced further forward than the base ignition timing SAb, and the spark plug 7 carries out ignition at the time specified by the ignition timing SA.

$$SA = SAb \times CVAR2(i) \quad (7)$$

Next, in step S25, first and second combustion variations are detected from the increase of the exhaust gas recirculation amount EGR and the advancement of the ignition timing SA, and the detected values are stored in a memory or the like in the ECU 21 as the first detected combustion variation value a and the second detected combustion variation value β.

Next, in step S26, it is determined whether or not at least one of the first detected combustion variation value α and the second detected combustion variation value β that have been acquired in step S25 is equal to or greater than respective first and second predetermined values that have been specified in advance, that is, whether or not the current first and/or the second combustion variation(s) exceeds (exceed) the permissible range.

If the result of the determination in step S26 is positive (yes), it means the condition is such that the first and/or second combustion variation(s) has (have) exceeded the permissible range (reached the combustion variation limit values) because of the increase of the exhaust gas recirculation amount EGR and the advancement of the ignition timing SA, and the value of the flag FVAR is set to be 1 in order to store that condition (step S27).

Then, in step S28, in order to put the exhaust gas recirculation amount EGR back to a previous value that has not reached the combustion variation limit value, the base exhaust gas recirculation amount EGRb is corrected using the previous first combustion variation manipulation correcting amount CVAR(i-1) so that the exhaust gas recirculation amount EGR falls within the permissible range of the first combustion variation. The correction of the exhaust gas recirculation amount EGR is performed using the previously-shown equation (4).

Likewise, in step S29, in order to put the ignition timing SA back to a previous value that has not reached the combustion variation limit value, the base ignition timing SAb is corrected using the second previous combustion variation manipulation correcting amount CVAR2(i-1) so that the ignition timing SA falls within the permissible range of the second combustion variation.

The correction of the ignition timing SA is performed using the following equation (8).

$$SA = SAb \times CVAR2(i-1) \quad (8)$$

The order of steps S28 and S29 is not limited to that described above; after completing steps S28 and S29, the process proceeds to step S33.

On the other hand, if the result of the determination in step S26 is negative (no), it means that the exhaust gas recirculation amount EGR and the ignition timing SA are in such a condition that the combustion variation does not exceed the maximum value within the permissible range, and the value of the flag FVAR is set to be 0 in order to store that condition (step S30).

Then, in order to update the current combustion variation manipulation correcting amount CVAR(i), first, in step S31, the current first combustion variation manipulation correcting amount CVAR(i) and the current second combustion variation manipulation correcting amount CVAR2(i) are stored in a memory or the like in the ECU 21 as a new previous first combustion variation manipulation correcting amount CVAR(i-1) and a new previous second combustion variation manipulation correcting amount CVAR2(i-1), respectively.

Subsequently, by adding the function $f(\alpha)$ that uses the first detected combustion variation value α stored at step S25 to the new previous first combustion variation manipulation correcting amount CVAR(i-1) stored at step S31, a new first combustion variation manipulation correcting amount CVAR(i) is obtained, and by adding the function $f(\beta)$ that uses the second detected combustion variation value β stored at step S25 to the new previous second combustion variation manipulation correcting amount CVAR2(i-1) stored at step S31, a new second combustion variation manipulation correcting amount CVAR2(i) is obtained (step S32); then, the process proceeds to step S33.

In step S33, it is determined whether or not the value of the flag FVAR is 1, that is, whether or not the condition is such that he first and/or second combustion variation(s) exceeds (exceed) the permissible range by both increasing the exhaust gas recirculation amount EGR and advancing the ignition timing SA.

If the result of the determination in step S33 is positive (yes), it is determined that the fuel consumption with the exhaust gas recirculation amount EGR, which is the first combustion variation manipulation amount, and with the ignition timing SA, which is the second combustion variation manipulation amount, has reached the fuel-consumption optimum value, and the process is terminated immediately.

On the other hand, if the result of the determination in step S33 is negative (no), it is determined that the fuel consumption has not yet reached the fuel-consumption optimum value, and the process that follows step S23 is repeated.

It should be noted that the foregoing description states the exhaust gas recirculation amount EGR is obtained using the previously-shown equation (2) and the ignition timing SA is obtained using the equation (7); nevertheless, it is also possible to obtain the exhaust gas recirculation amount EGR by EGR=EGRbΔCVAR2(i) and to obtain the ignition timing SA by SA=SAb×CVAR(i).

<B-2. Advantageous Effects>

As described above, according to the fuel consumption optimization control of the second preferred embodiment, the exhaust gas recirculation amount is increased and the ignition timing is advanced in combination according to the first and second detected combustion variation values based on the correlation between the exhaust gas recirculation amount and the ignition timing to realize the maximum exhaust gas recirculation amount and the maximum ignition timing advancement within the first and/or the second combustion variation limit value(s); as a consequence, the manipulation amounts can be set at the fuel-consumption optimum values that exist in the exhaust-gas-recirculation-amount increasing direction and in the ignition timing advancing direction, and the fuel consumption can be improved.

C. Third Preferred Embodiment

A third preferred embodiment according to the present invention is described with reference to FIG. 7.

The first preferred embodiment has described an example in which the exhaust gas recirculation amount EGR is used as the first combustion variation manipulation amount. The third preferred embodiment will describe a configuration in which a fuel consumption optimization control is carried out using air-fuel ratio AF as the first combustion variation manipulation amount.

<C-1. Fuel Consumption Optimization Control>

Figure 7:
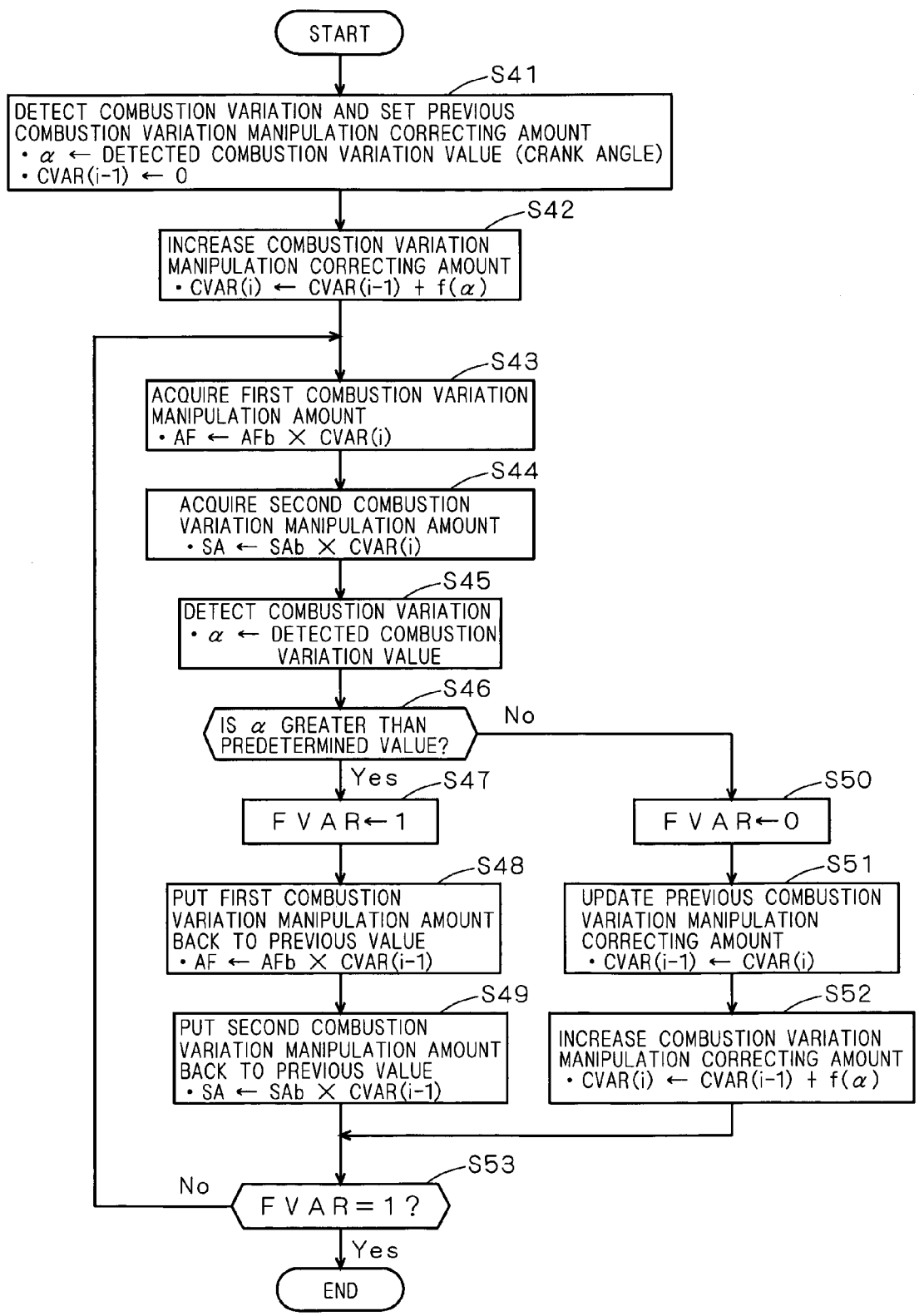
FIG. 7 is a flowchart illustrating a control operation of a control device for an internal combustion engine according to a third preferred embodiment of the present invention.

With reference to FIG. 1, a fuel consumption optimization control by the ECU 21 is described referring to the flowchart shown in FIG. 7. It should be noted that the processes of steps S41, S42, S44, S47, S49, S51, and S52 shown in FIG. 7 are the same as those of steps S1, S2, S4, S7, S11, and S12, discussed with reference to FIG. 3, and are therefore not further elaborated upon.

As shown in FIG. 7, after obtaining the combustion variation manipulation correcting amount CVAR(i) in step S42, a base air-fuel ratio AFb is corrected, in step S43, using a combustion variation manipulation correcting amount CVAR(i) obtained in step S42 or the later-described step S52 to obtain an air-fuel ratio AF that serves as a first combustion variation manipulation amount.

Here, the base air-fuel ratio AFb is calculated by the ECU 21 based on the air intake amount Q detected by the air flow meter 10 and the number of engine revolutions NE calculated from a signal of the crank angle sensor 19, and the air-fuel ratio AF is obtained using the following equation (9) so as to be to be leaner than the base air-fuel ratio AFb; the ECU 21 obtains a final fuel injection amount Ti based on the air-fuel ratio AF, and the fuel injection valve 8 supplies the fuel at an amount that is proportionate to the fuel injection amount Ti by injection.

$$AF = AFb \times CVAR(i) \quad (9)$$

In step S45, the combustion variation due to the enleaning of the air-fuel ratio AF and the advancing of the ignition timing SA, and the detected value is stored in a memory or the liken in ECU 21 as the combustion variation value α.

Next, in step S46, it is determined whether or not the detected combustion variation value α acquired in step S45 is equal to or greater than a predetermined value that has been specified in advance, that is, whether or not the current combustion variation exceeds a permissible range.

If the result of the determination in step S46 is positive (yes), it means the condition is such that the combustion variation has exceeded the permissible range because of the enleaning of the air-fuel ratio AF and the advancing of the ignition timing SA (reached the combustion variation limit value), and in order to store that condition, the value of the flag FVAR is set to be 1 (step S47).

Then, in step S48, in order to put the air-fuel ratio AF back to a previous value that has not reached the combustion variation limit value, the base air-fuel ratio AFb is corrected using the previous combustion variation manipulation correcting amount CVAR(i–1) so that the air-fuel ratio AF falls with in the permissible range of the combustion variation.

The correction of the air-fuel ratio AF is carried out using the following equation (10).

$$AF = AFb \times CVAR(i-1) \quad (10)$$

On the other hand, if the result of the determination in step S46 is negative (no), it means that the air-fuel ratio AF and the ignition timing SA are in such a condition that the combustion variation does not exceed the maximum value within the permissible range, and the value of the flag FVAR is set to be 0 in order to store that condition (step S50).

In step S53, it is determined whether or not the value of the flag FVAR is 1, that is, whether or not the combustion variation exceeds the permissible range by both enleaning the air-fuel ratio AF and advancing the ignition timing SA.

Then, if the result of the determination in step S53 is positive (yes), it is determined that the fuel consumption with the air-fuel ratio AF, which is the first combustion variation manipulation amount, and with the ignition timing SA, which is the second combustion variation manipulation amount, has reached the fuel-consumption optimum value, and the process is terminated immediately.

On the other hand, if the result of the determination in step S53 is negative (no), the fuel consumption has not reached the fuel-consumption optimum value, and the process that follows step S43 is repeated.

<C-2. Advantageous Effects>

As described above, according to the fuel consumption optimization control of the third preferred embodiment, the air-fuel ratio is enleaned and the ignition timing is advanced in combination according to the detected combustion variation value based on the correlation between the air-fuel ratio and the ignition timing, to realize the enleanment of the air-fuel ratio and the maximum ignition timing advancement within the combustion variation limit values; as a consequence, the manipulation amounts can be set at the fuel-consumption optimum values that exist in the air-fuel ratio enleaning direction and in the ignition timing advancing direction, and the fuel consumption can be improved.

D. Fourth Preferred Embodiment

A fourth preferred embodiment according to the present invention is described with reference to FIG. 8.

The second preferred embodiment has shown an example in which the exhaust gas recirculation amount EGR is used as the first combustion variation manipulation amount; the fourth preferred embodiment will describe a configuration in which a fuel consumption optimization control is performed using air-fuel ratio AF as the first combustion variation manipulation amount.

<D-1. Fuel Consumption Optimization Control>

Figure 8:
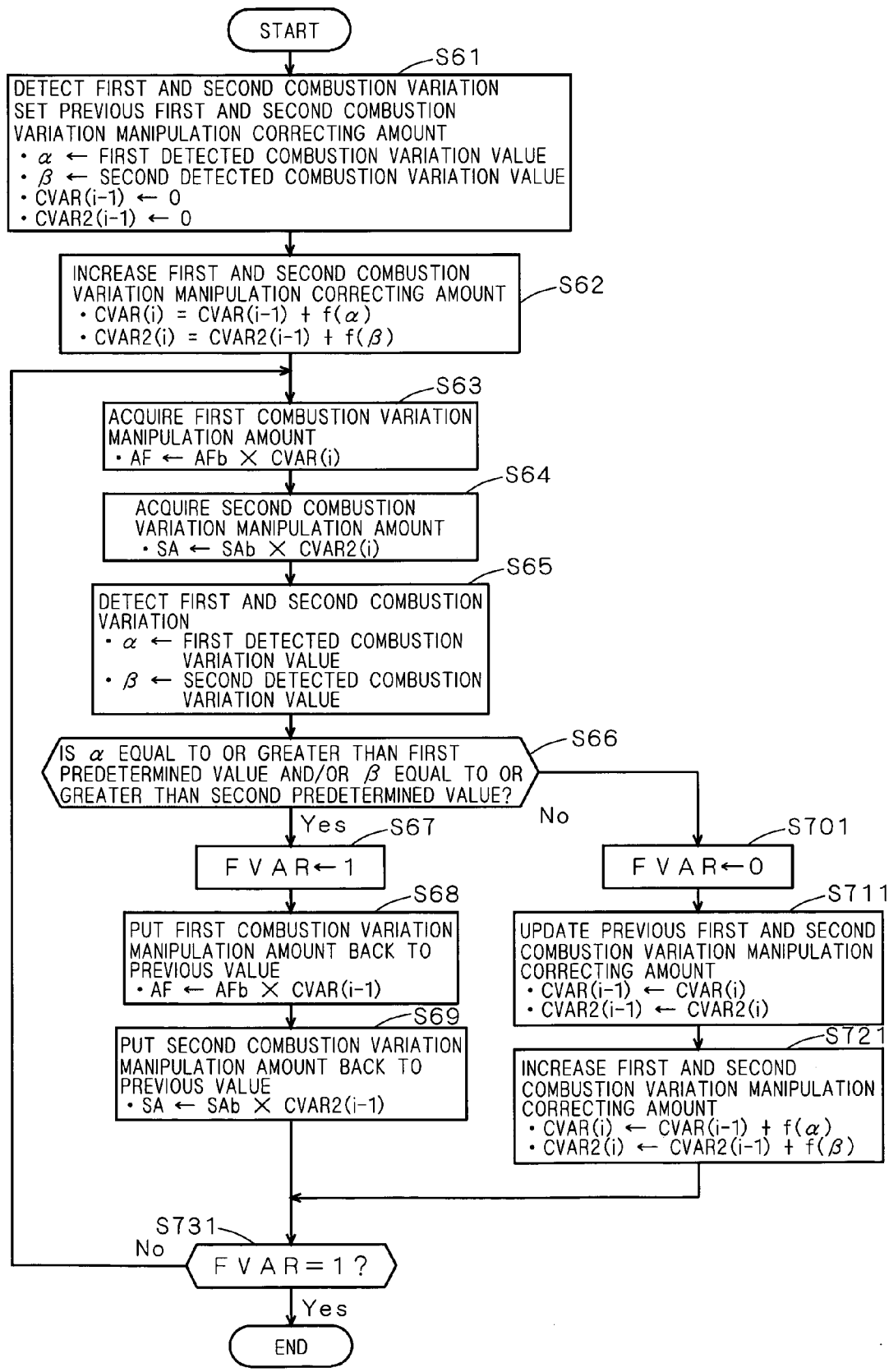
FIG. 8 is a flowchart illustrating a control operation of a control device for an internal combustion engine according to a fourth preferred embodiment of the present invention.

With reference to FIG. 1, a fuel consumption optimization control according to the fourth preferred embodiment is described referring to the flowchart shown in FIG. 8. It should be noted that the processes of steps S61, S62, S64, S67, S69, S71, and S72 shown in FIG. 8 are the same as those of steps S21, S22, S24, S27, S29, S31, and S32, discussed with reference to FIG. 5, and are therefore not further elaborated upon.

As shown in FIG. 8, after the first combustion variation manipulation correcting amount CVAR(i) and the second combustion variation manipulation correcting amount CVAR2(i) are obtained in step S62, the base air-fuel ratio AFb is corrected in step S63, using a combustion variation manipulation correcting amount CVAR(i) obtained in step S62 or the later-described step S72 to obtain an air-fuel ratio AF that serves as a first combustion variation manipulation amount. It should be noted that the air-fuel ratio AF is obtained so as to be leaner than the base air-fuel ratio AFb using the previously-shown equation (9).

In step S65, first and second combustion variations due to the enleaning of the air-fuel ratio AF and the advancing of the ignition timing SA are detected, and the detected values are stored in a memory or the like in the ECU 21 as the first detected combustion variation value a and the second detected combustion variation value β, respectively.

Next, in step S66, it is determined whether or not at least one of the first detected combustion variation value α and the second detected combustion variation value β that have been acquired at step S65 is equal to or greater than respective first and second predetermined values that have been specified in advance, that is, whether or not the current first and/or the second combustion variation(s) exceeds (exceed) the permissible range.

If the result of the determination in step S66 is positive (yes), it means the condition is such that the first and/or second combustion variation(s) has (have) exceeded the permissible range (reached the combustion variation limit values) because of the enleaning of the air-fuel ratio AF and the advancing of the ignition timing SA, and the value of the flag FVAR is set to be 1 in order to store that condition (step S67).

Then, in step S68, in order to put the air-fuel ratio AF back to a previous value that has not reached the combustion variation limit value, the base air-fuel ratio AFb is corrected using the previous first combustion variation manipulation correcting amount CVAR(i−1) so that the air-fuel ratio AF falls within the permissible range of the first combustion variation. The correction of the air-fuel ratio AF is performed using the previously-shown equation (10).

On the other hand, if the result of the determination in step S66 is negative (no), it means that the air-fuel ratio AF and the ignition timing SA are in such a condition that the combustion variation does not exceed the maximum value within the permissible range, and the value of the flag FVAR is set to be 0 in order to store that condition (step S70).

In step S73, it is determined whether or not the value of the flag FVAR is 1, that is, whether or not the condition is such that he first and/or second combustion variation(s) exceeds (exceed) the permissible range by both enleaning the air-fuel ratio AF and advancing the ignition timing SA.

If the result of the determination in step S73 is positive (yes), it is determined that the fuel consumption with the air-fuel ratio AF, which is the first combustion variation manipulation amount, and with the ignition timing SA, which is the second combustion variation manipulation amount, has reached the fuel-consumption optimum value, and the process is terminated immediately.

On the other hand, if the result of the determination in step S73 is negative (no), it is determined that the fuel consumption has not yet reached the fuel-consumption optimum value, and the process that follows step S63 is repeated.

<D-2. Advantageous Effects>

As described above, according to the fuel consumption optimization control of the fourth preferred embodiment, the air-fuel ratio is enleaned and the ignition timing is advanced in combination according to the first and second detected combustion variation values based on the correlation between the air-fuel ratio and the ignition timing to realize the maximum enleanment of the air-fuel ratio and the maximum ignition timing advancement within the first and/or the second combustion variation limit value(s); as a consequence, the manipulation amounts can be set at the fuel-consumption optimum values that exist in the air-fuel ratio enleaning direction and in the ignition timing advancing direction, and the fuel consumption can be improved.

E. Fifth Preferred Embodiment

A fifth preferred embodiment according to the present invention is described with reference to FIGS. 9 to 13.

A fuel consumption optimization control according to the fifth preferred embodiment is described concerning a control in which an operating condition-determining section is provided in the ECU 21 so that a combustion variation is manipulated according to the operating condition.

In order to carry out the fuel consumption optimization control of the present preferred embodiment, the operating condition-determining section of the ECU 21 determines, based on an operating condition map in which numbers of engine revolutions are mapped along the horizontal axis and engine loads are mapped along the vertical axis to classify the operating conditions, the current operating condition to be which of the classified operating conditions, and manipulates a combustion variation according to the determined operating condition.

Here, the concept of an operating condition map in the ECU 21 is discussed with reference to FIG. 9.

Figure 9:
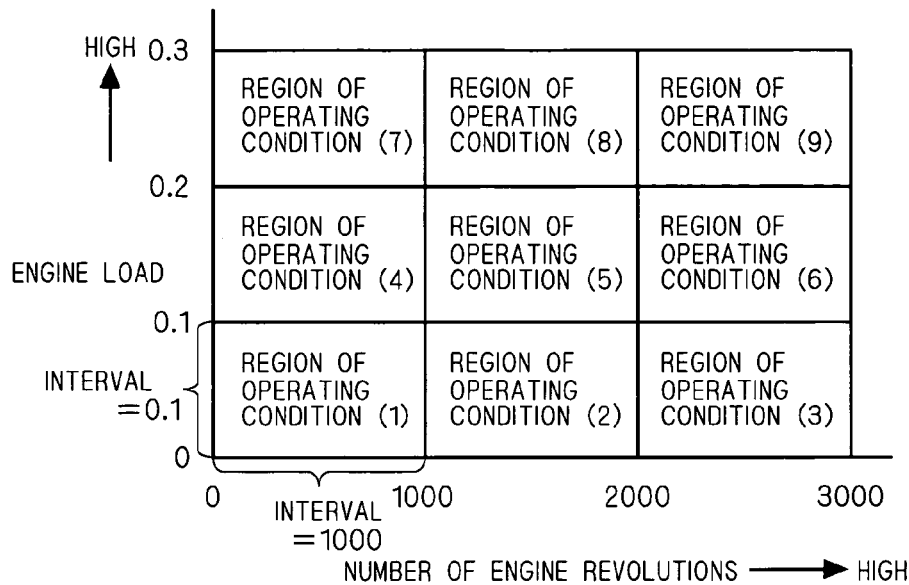
FIG. 9 is a conceptual view illustrating an operating condition map.

In FIG. 9, numbers of engine revolutions are divided at every 1000 revolutions, and engine loads are divided at every 0.1; and a region formed by an interval of 0.1 along the vertical axis and an interval of 1000 along the horizontal axis is classified as a region that represents one operating condition.

For example, in FIG. 9, numbers of engine revolutions of 0 to 1000 and engine loads of 0 to 0.1 are classified into an operating condition (1). Likewise, regions of engine loads 0 to 0.1 and numbers of engine revolutions up to 3000 is classified into operating conditions (2) and (3); regions of engine loads of 0.1 to 0.2 are classified into operating conditions (4) to (6), and regions of engine loads of 0.2 to 0.3 are classified into operating conditions (7) to (9).

Accordingly, if the ECU 21 detects a condition in which the current number of engine revolutions is 500 revolutions and the engine load is 0.05, it is determined as the operating condition (1).

It should be noted that the ECU 21 does not actually has an operating condition map as shown in FIG. 9, but it determines, in an operating condition-determining section provided in the ECU 21, a current operating condition by applying a detected value to regions that are categorized based on the classification interval of numbers of engine revolutions and the classification interval of engine load that have been determined in advance.

Here, the classification interval for numbers of engine revolutions and the classification interval for engine load may be arbitrarily set and are not limited to the above-noted numerical values. In addition, the upper and lower limit values for number of engine revolutions and the upper and lower limit values for engine load may also be arbitrarily set and are not limited to the above-noted numerical values.

In addition, the operating conditions are not necessarily defined by only the number of engine revolutions and the engine load but may be defined using at least one factor among coolant temperature, intake air temperature, elapsed time after engine start-up, and the like.

For example, it is possible to define the operating condition only by one factor; for example, in cases where the operating condition changes depending on the elapsed time after engine start-up, the operating condition may be defined only by the elapsed time after engine start-up. Alternatively, it is possible to use a plurality of factors to define the operating condition; for example, the operating condition may be defined using three factors, the number of engine revolutions, the engine load, and the coolant temperature.

<E-1. Fuel Consumption Optimization Control>

Figure 10:
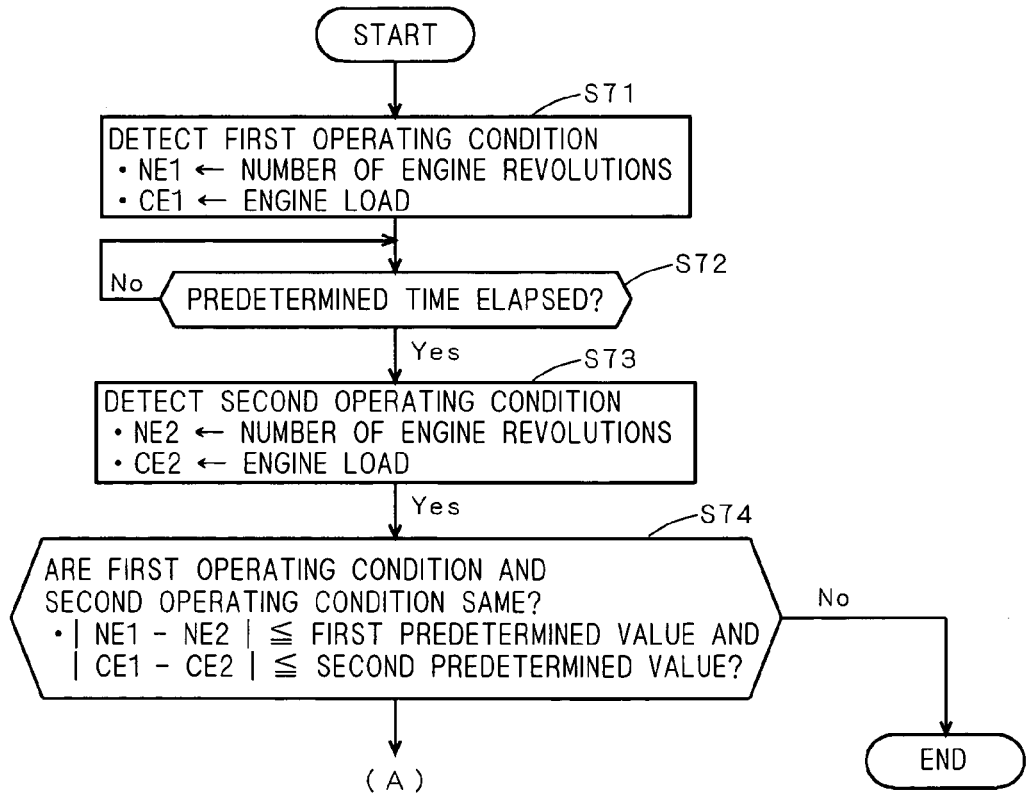
FIG. 10 is a flowchart illustrating a control operation of a control device for an internal combustion engine according to a fifth preferred embodiment of the present invention.

With reference to FIG. 1, a fuel consumption optimization control with the ECU 21 is described below referring to the flowcharts shown in FIGS. 10 and 11. It should be noted that FIGS. 10 and 11 show a continuous process in two separate sheets, which is connected at symbol (A). The process operation shown in FIGS. 10 and 11 is executed repeatedly at each predetermined time (for example, each 10 msec.).

Upon starting the process operation, in step S71 shown in FIG. 10, the operating condition at that time point (the time point at which the process operation starts) is detected as a first operating condition, and the number of engine revolutions and the engine load at that time are stored in a memory or the like in the ECU 21 as a number of engine revolutions NE1 and an engine load CE1.

Next, the process stands by until a predetermined time elapses (step S72), and after the predetermined time has elapsed, the process proceeds to step S73.

In step S73, the operating condition at that time point (the time point at which the predetermined time has elapsed since the first operating condition was detected) is detected as a second operating condition, and the number of engine revolutions and the engine load at that time are stored in a memory or the like in the ECU 21 as a number of engine revolutions NE2 and an engine load CE2, respectively.

Next, in step S74, the two operating conditions detected at steps S71 and S72 are compared, and it is determined whether or not the amount of variation between the numbers of engine revolutions (|NE1−NE2|) is equal to or less than a first predetermined value that has been specified in advance and the amount of variation between the engine loads (|CE1−CE2|) is equal to or less than a second predetermined value that has been specified in advance.

Then, if it is determined in step S74 that the amount of variation of the numbers of engine revolutions and the amount of variation of the engine loads are equal to or less than the first and second predetermined values, respectively (in the case of "yes"), it is judged that the engine is in a normal operating condition, and the process proceeds to step S75 shown in FIG. 11.

On the other hand, if the amount of variation of the numbers of engine revolutions and the amount of variation of the engine loads are greater than the predetermined values in step S74 (in the case of "no"), it is judged that the operating condition is not normal, and the process is terminated immediately.

Next, in step S75 shown in FIG. 11, the number of engine revolutions and the engine load at that time point are detected, and according to the result of the detection, the operating condition is determined in the operating condition-determining section based on the above-described operating condition map. Also, the detected number of engine revolutions and engine load are stored in a memory or the like in the ECU 21 as the number of engine revolutions NE and the engine load CE, respectively.

Next, referring to a combustion variation map, a mapped value that corresponds to the operating condition determined in step S75 is read out and stored in a memory or the like in the ECU 21 as a combustion variation manipulation correcting amount CVAR(i) (step S76).

Here, the the combustion variation map is explained with reference to FIG. 12.

As shown in FIG. 12, the combustion variation map is created so as to correspond to the operating condition map, which has been explained with reference to FIG. 9; its horizontal axis represents numbers of engine revolutions while its vertical axis represents engine loads, and combustion variation manipulation correcting amounts are stored in the regions that are categorized based on a predetermined classification interval for the numbers of engine revolutions and a predetermined classification interval for engine loads.

For example, the configuration is such that a combustion variation manipulation correcting amount a is entered in the region that represents the operating condition (1) in the operating condition map shown in FIG. 9. It should be noted that the combustion variation map stores the final values of combustion variation manipulation correcting amounts in the case where a combustion variation manipulation has been performed; in the case where a combustion variation manipulation has not been performed even one time, that is, in the case where it has not been determined as "yes" even one time in step S74 shown in FIG. 10, the combustion variation map stores 1 as the initial value. FIG. 12 shows the initialized state of the combustion variation map, in which all the regions store an initial value "1".

Thus, in step S76, if the operating condition detected at step S75 is the operating condition (1) in the operating condition map, a mapped value "1" (initial value) is read out from the combustion variation map shown in FIG. 12 and is stored as a combustion variation manipulation correcting amount CVAR(i).

Next, it is judged in step S77 whether or not the combustion variation manipulation correcting amount CVAR(i) stored at step S76 is the initial value of the combustion variation map, that is, whether or not the combustion variation manipulation is performed at least one time in the operating condition determined at step S75.

Then, if the result of the determination in step S77 is positive (yes), the process proceeds to step S80.

On the other hand, if the result of the determination in step S77 is negative (no), the base exhaust gas recirculation amount EGRb is corrected in step S78 using the combustion variation manipulation correcting amount CVAR(i) obtained in step S76 to obtain an exhaust gas recirculation amount EGR that serves a the first combustion variation manipulation amount.

The exhaust gas recirculation amount EGR is obtained so as to be greater than the base exhaust gas recirculation amount EGRb using the previously-shown equation (2).

Next, in step S79, the base ignition timing SAb is corrected using the combustion variation manipulation correcting amount CVAR(i) obtained in step S76 to obtain an ignition timing SA that serves as a second combustion variation manipulation amount.

The ignition timing SA is obtained using the previously-shown equation (3) so as to be advanced further forward than the base ignition timing SAb. After completing step S79, the process proceeds to step S82.

With steps S78 and S79, the combustion variation manipulations up to the previous time in the same operating condition can be reflected.

In step S80, the base exhaust gas recirculation amount EGRb is corrected using the combustion variation manipulation correcting amount CVAR(i) obtained in step S76 or in the later-described step S90 to obtain an exhaust gas recirculation amount EGR that serves as a first combustion variation manipulation amount.

The exhaust gas recirculation amount EGR is obtained using the previously-shown equation (2) so as to be greater than the base exhaust gas recirculation amount EGRb.

Next, in step S81, the base ignition timing SAb is corrected using the second combustion variation manipulation correcting amount CVAR(i) obtained in step S76 or the later-described step S90 to obtain an ignition timing SA that serves as a second combustion variation manipulation amount.

The ignition timing SA is obtained using the previously-shown equation (3) so as to be advanced further forward than the base ignition timing SAb.

Next, in step S82, the combustion variation due to the increase of the exhaust gas recirculation amount EGR and the advancement of the ignition timing SA is detected, and the detected value is stored in a memory or the like in the ECU 21 as a detected combustion variation value α.

Next, in step S83, it is determined whether or not the detected combustion variation value a acquired in step S82 is equal to or greater than a predetermined value that has been specified in advance, that is, whether or not the current combustion variation exceeds the permissible range.

If the result of the determination in step S83 is positive (yes), it means the condition is such that the combustion variation has exceeded the permissible range (reached the combustion variation limit value) because of the increase of the exhaust gas recirculation amount EGR and the advancement of the ignition timing SA, and the value of the flag FVAR is set to be 1 in order to store that condition (step S84).

Then, in step S85, in order to put the exhaust gas recirculation amount EGR back to a previous value that has not reached the combustion variation limit value, the base exhaust gas recirculation amount EGRb is corrected using the previous combustion variation manipulation correcting amount CVAR(i-1) so that the exhaust gas recirculation amount EGR falls within the permissible range of the combustion variation. The correction of the exhaust gas recirculation amount EGR is performed using the previously-shown equation (4).

Likewise, in step S86, in order to put the ignition timing SA back to a previous value that has not reached the combustion variation limit value, the base ignition timing SAb is corrected using the previous combustion variation manipulation correcting amount CVAR(i-1) so that the ignition timing SA falls within the permissible range of the combustion variation. The correction of the ignition timing SA is performed using the previously-shown equation (5).

The order of steps S85 and S86 is not limited to that described above; after completing steps S85 and S86, the process proceeds to step S91.

On the other hand, if the result of the determination in step S83 is negative (no), it means that the exhaust gas recirculation amount EGR and the ignition timing SA are in such a condition that the combustion variation does not exceed the maximum value within the permissible range, and the value of the flag FVAR is set to be 0 in order to store that condition (step S87).

Then, in step S88, the combustion variation map is referenced using the number of engine revolutions NE and the engine load CE that have been detected in step S75, the combustion variation manipulation correcting amount in the map region containing the number of engine revolutions NE and the engine load CE is rewritten with the current combustion variation manipulation correcting amount CVAR(i).

Here, an example of the rewriting of the combustion variation map is shown in FIG. 13.

In FIG. 13, "X" is stored as a manipulation correcting amount a in the region of the operating condition (1) of the operating condition map shown in FIG. 9. The combustion variation manipulation correcting amounts in the regions of the other operating conditions remain with the initial value "1".

This means that the operating condition detected in step S75 is the operating condition (1) in the operating condition map, and the value of the current combustion variation manipulation correcting amount CVAR(i) "X" is stored at step S88 as a new combustion variation manipulation correcting amount for the region of the operating condition (1).

Next, in order to update the current combustion variation manipulation correcting amount CVAR(i), first, in step S89, the current combustion variation manipulation correcting amount CVAR(i) is stored in a memory or the like in the ECU 21 as a new previous combustion variation manipulation correcting amount CVAR(i-1).

Subsequently, the function f(α) that uses the detected combustion variation value α stored at the step S82 is added to the new previous combustion variation manipulation correcting amount CVAR(i-1) stored at step S89 to thereby obtain a new combustion variation manipulation correcting amount CVAR(i) (step S90), and the process proceeds to step S91. It should be noted that the function f(α) has been discussed with reference to FIG. 4, and the combustion variation manipulation correcting amount CVAR(i) is obtained using the previously-shown equation (1).

In step S91, it is determined whether or not the value of the flag FVAR is 1, that is, whether or not the condition is such that the combustion variation exceeds the permissible range by both increasing the exhaust gas recirculation amount EGR and advancing the ignition timing SA.

Then, if the result of the determination in step S91 is positive (yes), it is determined that the fuel consumption with the exhaust gas recirculation amount EGR, which is the first combustion variation manipulation amount, and with the ignition timing SA, which is the second combustion variation manipulation amount, has reached the fuel-consumption optimum value, and the process is terminated immediately.

On the other hand, if the result of the determination in step S91 is negative (no), it is determined that the fuel consumption has not yet reached the fuel-consumption optimum value, and the process that follows step S80 is repeated.

<E-2. Advantageous Effects>

As described above, according to the fuel consumption optimization control of the fifth preferred embodiment, the maximum exhaust gas recirculation amount and the maximum ignition timing advancement are realized within the combustion variation limit values with combining exhaust gas recirculation amounts and ignition timings based on the correlation between the exhaust gas recirculation amount and the ignition timing; as a consequence, the manipulation amounts can be set at the fuel-consumption optimum values that exist in the exhaust-gas-recirculation-amount increasing direction and in the ignition timing advancing direction, and the fuel consumption can be improved.

Moreover, since the current operating condition is determined to be which of the classified operating conditions based on the operating condition map that classifies operating conditions, and the combustion variation is manipulated according to the determined operating condition, it is possible to perform a fuel consumption optimization control suitable for the operating condition.

Furthermore, since the combustion variation map stores, for each operating condition, a final value of combustion variation manipulation correcting amount when a combustion variation manipulation has been performed, the combustion variation map is updated with the latest value of combustion variation manipulation correcting amount, making it possible to perform a fuel consumption optimization control suitable for the operating condition.

F. Sixth Preferred Embodiment

A sixth preferred embodiment according to the present invention is described with reference to FIGS. 14 to 17.

A fuel consumption optimization control according to the sixth preferred embodiment is described concerning an example in which an operating condition-reflecting correcting section is provided in the ECU 21 and a fuel consumption optimization control is performed, if an operating condition is detected for the first time, by correcting the current operating condition using a combustion variation manipulation correcting amount for an operating condition that has already been detected, that is, an operating condition for which a combustion variation manipulation correcting amount other than an initial value is stored in a combustion variation map.

<F-1. Fuel Consumption Optimization Control>

Figure 15:
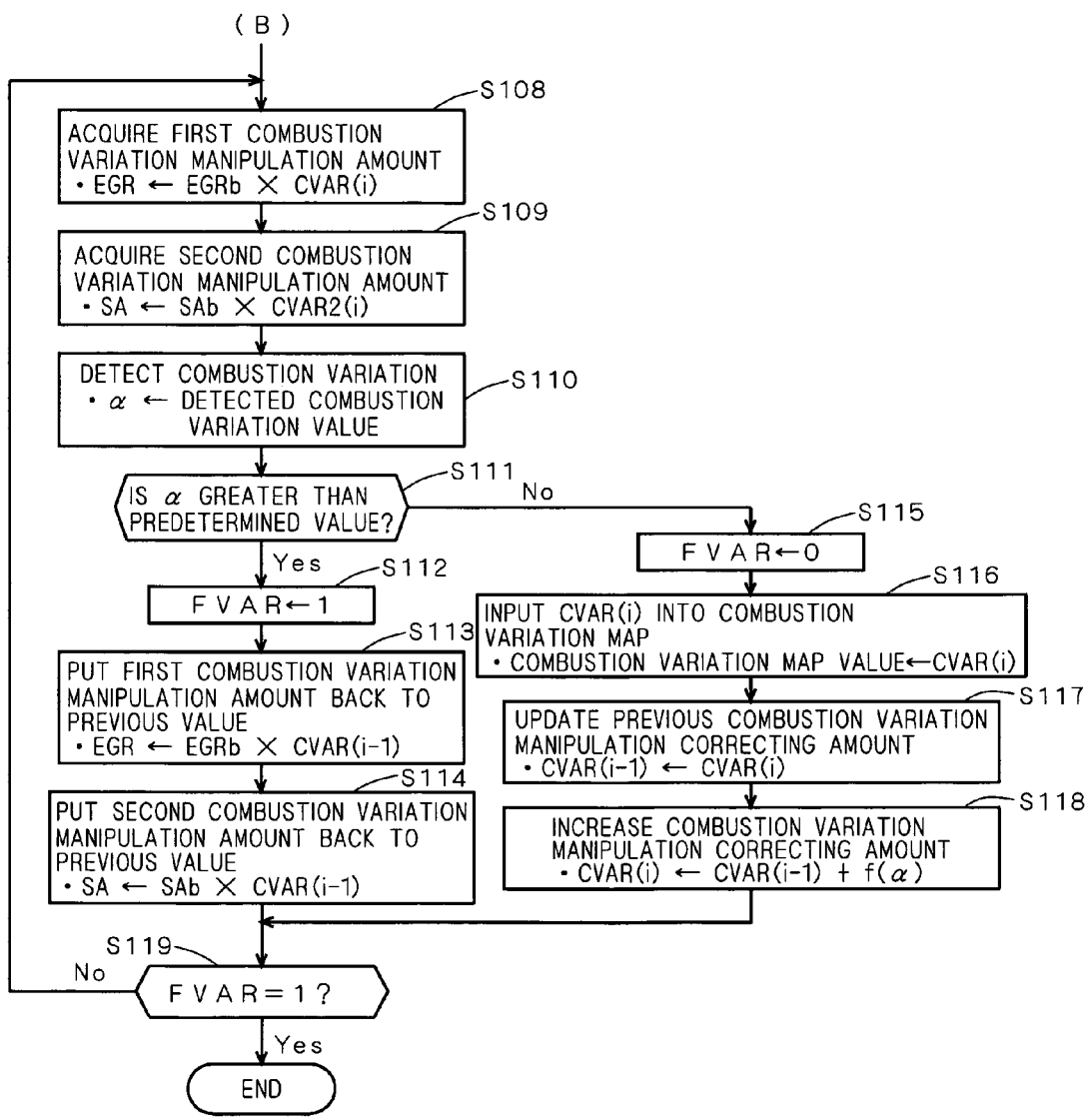
FIG. 15 is a flowchart illustrating a control operation of a control device for an internal combustion engine according to a sixth preferred embodiment of the present invention.

With reference to FIG. 1, a fuel consumption optimization control with the ECU 21 is described below referring to the flowcharts shown in FIGS. 14 and 15. It should be noted that FIGS. 14 and 15 show a continuous process in two separate sheets, which is connected at symbol (B). The process operation shown in FIGS. 14 and 15 is executed repeatedly at each predetermined time (for example, each 10 msec.).

Upon starting the process operation, it is determined whether or not the engine is in a normal operating condition through steps S101 to S104 shown in FIG. 14. This series of process is the same as the process of steps S71 to S74, which has been explained in the fifth preferred embodiment with reference to FIG. 10, and therefore is not further elaborated upon.

After step S104, if the engine is in an normal operating condition, the process proceeds to step S105, whereas if the operating condition is not normal, the process is terminated immediately.

Next, after steps S105 and S106, a mapped value that corresponds to the current operating condition is read out from the combustion variation map and is stored in a memory or the like in the ECU 21 as a combustion variation manipulation correcting amount CVAR(i). This series of process is the same as that of the process of steps S75 and S76, which has been explained in the fifth preferred embodiment with reference to FIG. 11, and is therefore not further elaborated upon.

Next, it is judged in step S107 whether or not the combustion variation manipulation correcting amount CVAR(i) stored at step S106 is an initial value of the combustion variation map, that is, whether or not a combustion variation manipulation has been performed at least one time under the operating condition that has been determined at step S105.

Then, if the result of the determination in step S107 is negative (no), that is, if the combustion variation manipulation has been performed at least one time under the operating condition determined at step S105, the process proceeds to step S108.

On the other hand, if the result of the determination in step S107 is positive (yes), that is, if the combustion variation manipulation has not been performed even one time in the operating condition determined at step S105, the process proceeds to step S120.

In step S120, one of the other operating conditions is selected for which a combustion variation manipulation correcting amount other than the initial value is stored in the combustion variation map, and the combustion variation manipulation correcting amount for the selected other operating condition is temporarily stored as a previous combustion variation manipulation correcting amount CVAR(i−1).

Next, in step S121, the combustion variation manipulation correcting amount CVAR(i) for the current operating condition is corrected using the previous combustion variation manipulation correcting amount CVAR(i−1) stored at step S120 and an operating condition-correction coefficient γ, and thereby, an operating condition-reflecting correcting amount can be obtained that reflects the combustion variation mapped value for the other operating condition. The obtained operating condition-reflecting correcting amount is stored as a combustion variation manipulation correcting amount CVAR(i) for the current operating condition.

The operating condition-reflecting correcting amount can be obtained by the following equation (11).

$$CVAR(i) = CVAR(i) \times CVAR(i-1) \times \gamma \qquad (11)$$

The operating condition-correction coefficient γ used is a numerical value that has been specified in advance corresponding to the difference between the combustion variation manipulation correcting amount in the current operating condition detected at step S105 and the combustion variation manipulation correcting amount in the other operating condition selected at step S120.

Here, an exampe of the combustion variation map that stores combustion variation manipulation correcting amounts other than an initial value is shown in FIG. 16.

FIG. 16 is basically identical to the combustion variation map shown in FIG. 13; however, combustion variation manipulation correcting amounts a, b, c, d, and e shown in FIG. 16 are other than the initial value, i.e., they are combustion variation manipulation correcting amounts for other operating conditions. Combustion variation manipulation correcting amounts f, g, h, and i are the initial value "1".

In such a map, if the current operating condition is an operating condition having a combustion variation manipulation correcting amount g, for example, and if an operating condition having a combustion variation manipulation correcting amount a is selected as the other operating condition in step S120, the γ value is obtained from a table that has been provided in advance based on the difference between the combustion variation manipulation correcting amount g and the combustion variation manipulation correcting amount a in step S121.

In the just-mentioned table, operating condition-correction coefficients γ are set so as to correspond a variety of differences in the combustion variation manipulation correcting amounts, and the information is stored in a memory or the like in the ECU 21.

Here, the operating condition-correction coefficient γ is set based on the difference in the numbers of engine revolutions and the engine loads between the operating conditions; for example, γ is set to be large between similar operating conditions, such as between the operating conditions (1) and (2) shown in FIG. 9, whereas γ is set to be small between greatly different operating conditions, such as between the operating conditions (1) and (9). The value of the operating condition-correction coefficient γ is set to be in the range of $0 \leq \gamma \leq 1$.

Additionally, with the equation (11), a method has been explained for obtaining a combustion variation manipulation correcting amount CVAR(i) by the multiplication of the previous combustion variation manipulation correcting amount CVAR(i−1) by the combustion variation manipulation correcting amount CVAR(i) for the current operating condition, but similar effects can be obtained by using addition in place of the multiplication.

Further, the combustion variation manipulation amount for the current operating condition may be corrected using only the combustion variation manipulation correcting amount for the other operating condition, without using the operating condition-correction coefficient γ.

Next, in step S122, in order to store the fact that the combustion variation manipulation correcting amount in the other operating condition selected in step S120 has been used for correcting the combustion variation manipulation correcting amount CVAR(i) for the current operating condition, the value of the flag FREV for the other operating condition in the combustion variation map is set to be "1".

FIG. 17 shows respective values of flag FREV for respective operating conditions in the combustion variation map. In FIG. 17, the flag FREV is "1" in the operating condition that is selected at step S120 as the other operating condition because it has undergone step S122, which has the combustion variation manipulation correcting amount a, whereas the flag is "0" in the rest of the operating conditions.

Next, in step S123, it is determined whether the combustion variation manipulation correcting amount for the current operating condition has been corrected based on the combustion variation manipulation correcting amounts for all the operating conditions that have a combustion variation manipulation correcting amount other than the initial value in the combustion variation map.

Then, if the result of the determination is negative (no) in step S123, the process returns to step S120 and the process of steps S120 to S122 is repeated.

That is, the process of steps S120 to S122 is executed for all the operating conditions that have an combustion variation manipulation correcting amount other than the initial value in the combustion variation map; if explained referring to the combustion variation map shown in FIG. 17, the process is repeated until the flags FREV become "1" for all the operating conditions that are within the thick-line frame.

On the other hand, if the result of the determination is positive (yes) in step S123, it is judged that the correction of combustion variation manipulation correcting amount CVAR(i) is completed, and the flags FREV for all the operating conditions in the combustion variation map are initialized to "0" in step S124; then, the process proceeds to step S108.

In step S108, the base exhaust gas recirculation amount EGRb is corrected using a combustion variation manipulation correcting amount CVAR(i) obtained in any one of steps S106, S121 and later-described step S118, to obtain an exhaust gas recirculation amount EGR that serves as a first combustion variation manipulation amount.

The exhaust gas recirculation amount EGR is obtained so as to be greater than the base exhaust gas recirculation amount EGRb using the previously-shown equation (2).

Next, in step S109, the base ignition timing SAb is corrected using a combustion variation manipulation correcting amount CVAR(i) obtained in any one of steps 106, 123 and the later-described step S118 to obtain an ignition timing SA that serves as a second combustion variation manipulation amount.

The ignition timing SA is obtained using the previously-shown equation (3) so as to be advanced further forward than the base ignition timing SAb.

The subsequent process of steps S110 to S119 is the same as the process of steps S82 to S91, explained with reference to FIG. 11, and is therefore not further elaborated upon.

<F-2. Advantageous Effects>

As described above, with the fuel consumption optimization control in accordance with the sixth preferred embodiment, the processes of steps S120 to S124 are carried out in the operating condition-reflecting correcting section within the ECU 21 so that when the current operating condition is an operating condition that has been detected for the first time, the combustion variation manipulation correcting amount for the current operating condition is corrected using an operating condition-correction coefficient γ that has been specified in advance and a combustion variation manipulation correcting amount for an operating condition that has already been detected, that is, an operating condition for which a combustion variation manipulation correcting amount other than the initial value is stored in the combustion variation map. Therefore, in the operating condition that has been detected for the first time, it is unnecessary to change combustion variation manipulation correcting amounts one by one from the initial value, making it possible to perform a fuel consumption optimization control operation more quickly.

Moreover, the process from step S120 up to step S122 is executed for all the operating conditions that have a combustion variation manipulation correcting amount other than the initial value in the combustion variation map; therefore, the accuracy in correcting the combustion variation manipulation correcting amount for the current operating condition can be enhanced, and thus, a more accurate fuel consumption optimization control can be performed.

G. Modified Example

The above-described first to sixth preferred embodiments have shown examples in which a combustion variation is detected using the variation in number of revolutions originating from the crank angle sensor output or the amount of variation in average value originating from the knock sensor output; however, other than those, it is also possible to calculate an amount of variation in various signals such as an air-fuel ratio sensor signal, a cylinder internal pressure sensor signal, an ion current sensor signal, an exhaust-gas-component-concentration sensor signal, to perform a combustion variation detection using the calculated amount.

Although the first to sixth preferred embodiments have described the methods in which a combustion variation manipulation correcting amount CVAR(i) is obtained by adding a previous combustion variation manipulation correcting amount CVAR(i−1) and a function f(α) of detected combustion variation value α, such as by the equation (1), similar effects can be obtained by multiplying by f(α) in place of the addition.

Further, as with the equation (6), the foregoing preferred embodiments have described methods in which a second combustion variation manipulation correcting amount CVAR2(i) is obtained by adding a previous second combustion variation manipulation correcting amount CVAR2(i−1) and a function f(β) of a second detected combustion variation value β, but similar effects can be obtained by multiplying by f(β) in place of the addition.

Moreover, as explained with the equations (2) to (5), the foregoing preferred embodiments have described methods in which an exhaust gas recirculation amount EGR and an ignition timing SA are obtained through multiplication of the base exhaust gas recirculation amount EGRb and the basic ignition timing SAb, respectively, by a combustion variation manipulation correcting amount CVAR(i) or by a previous combustion variation manipulation correcting amount CVAR(i−1); however, similar effects can be obtained by using addition in place of multiplication.

In addition, a coefficient KSTEP(i) represented by a linear function and its previous coefficient KSTEP(i−1) may be used in place of the combustion variation manipulation correcting amount CVAR(i) and the previous combustion variation manipulation correcting amount CVAR(i−1).

Figure 18:
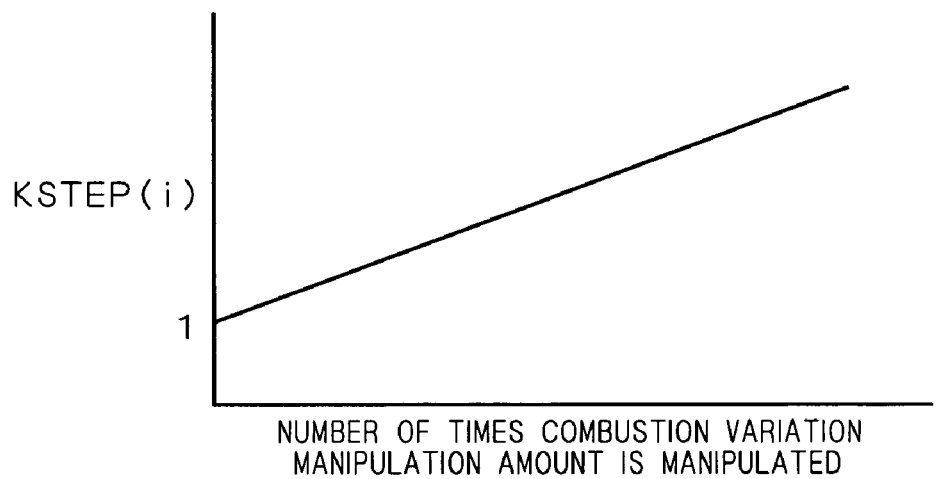
FIG. 18 is a graph showing one example of a coefficient KSTEP for obtaining combustion variation manipulation correcting amounts.

Here, an example of the coefficient KSTEP(i) is described with reference to FIG. 18. As shown in FIG. 18, the coefficient KSTEP(i) is expressed by a monotonously-increasing linear function having an initial value of "1", and is set so as to increase by a predetermined amount each time EGR or SA, which is a combustion variation manipulation amount, is manipulated one time.

Similar effects can be obtained also by using such a coefficient KSTEP(i) and a previous coefficient KSTEP (i−1).

While the invention has been shown and described in detail, the foregoing description is in all aspects illustrative and not restrictive. It is therefore understood that numerous other modifications and variations can be devised without departing from the scope of the invention.

What is claimed is:

1. A control device for an internal combustion engine, comprising:
   a combustion variation detecting section for detecting a combustion variation in the internal combustion engine and digitizing it as a combustion variation value;
   a computing section for calculating a combustion variation manipulation amount for manipulating said combustion variation in the internal combustion engine based on a combustion variation manipulation correcting amount;
   a combustion variation determining section for determining a combustion variation state in said internal combustion engine based on said combustion variation value;
   a combustion-variation-manipulation-correcting-amount changing section for changing said combustion variation manipulation correcting amount based on a result of the determination in said combustion variation determining section; and
   a combustion variation manipulating section for manipulating said combustion variation of said internal combustion engine based on said combustion variation manipulation amount;
   wherein said combustion variation manipulation correcting amount is repeatedly changed in said combustion-variation-manipulation-correcting-amount changing section until a determination result in said combustion variation determining section becomes a predetermined determination result, and
   wherein:
   said combustion variation manipulation amount includes an exhaust gas recirculation amount and an ignition timing of said internal combustion engine; and
   said combustion variation manipulating section manipulates said combustion variation of said internal combustion engine based on said exhaust gas recirculation amount and said ignition timing.

2. The control device for an internal combustion engine according to claim 1, wherein said combustion variation detecting section detects a combustion variation by detecting at least one variation among a variation of the number of revolutions, a knocking variation, an air-fuel ratio variation, a cylinder internal pressure variation, an ion current variation, and an exhaust gas component variation, of said internal combustion engine.

3. The control device for an internal combustion engine according to claim 1, further comprising:
   an operating condition-detecting section for detecting information about at least one factor among factors including a number of engine revolutions and a load of said internal combustion engine, a coolant temperature, an intake air temperature, and an elapsed time after engine start-up; and
   an operating condition-determining section for confirming a current operating condition of said internal combustion engine by determining that said information about said at least one factor detected in said operating condition-detecting section belongs to an operating condition among a plurality of operating conditions that have been prepared and classified in advance;
   wherein said combustion variation manipulating section manipulates a combustion variation of said internal combustion engine for each current operating condition of said internal combustion engine determined by said operating condition-determining section based on said combustion variation manipulation amount.

4. The control device for an internal combustion engine according to claim 3, wherein:
   said combustion variation manipulation correcting amount is provided so as to correspond to each of said plurality of classified operating conditions; and
   when said combustion variation manipulation correcting amount is changed in said combustion-variation-manipulation-correcting-amount changing section, said combustion variation manipulation correcting amount is changed to an undated combustion variation manipulation correcting amount.

5. The control device for an internal combustion engine according to claim 4, further comprising an operating condition-reflecting correcting section for, when said current operating condition that is detected by said operating condition-detecting section is an operating condition that has been detected for a first time, selecting an operating condition, from among said plurality of classified operating conditions, in which said combustion variation manipulation correcting amount has already been changed to said updated combustion variation manipulation correcting amount, and correcting said combustion variation manipulation correcting amount of said current operating condition using said updated combustion variation manipulation correcting amount.

6. The control device for an internal combustion engine according to claim 4, wherein when a plurality of operating conditions in which said combustion variation manipulation correcting amount has already been updated exists among said plurality of classified operating conditions, said operating condition-reflecting correcting section corrects said combustion variation manipulation correcting amount of said current operating condition using said updated combustion variation manipulation correcting amounts of all the operating conditions.

7. A control device for an internal combustion engine, comprising:
   a combustion variation detecting section for detecting a combustion variation in the internal combustion engine and digitizing it as a combustion variation value;
   a computing section for calculating a combustion variation manipulation amount for manipulating said combustion variation in the internal combustion engine based on a combustion variation manipulation correcting amount;

a combustion variation determining section for determining a combustion variation state in said internal combustion engine based on said combustion variation value;

a combustion-variation-manipulation-correcting-amount changing section for changing said combustion variation manipulation correcting amount based on a result of the determination in said combustion variation determining section; and a combustion variation manipulating section for manipulating said combustion variation of said internal combustion engine based on said combustion variation manipulation amount;

wherein said combustion variation manipulation correcting amount is repeatedly changed in said combustion-variation-manipulation-correcting-amount changing section until a determination result in said combustion variation determining section becomes a predetermined determination result, wherein said combustion variation manipulation amount includes an air-fuel ratio and an ignition timing of said internal combustion engine, and wherein said combustion variation manipulating section manipulates said combustion variation of said internal combustion engine based on said air-fuel ratio and said ignition timing.

8. The control device for an internal combustion engine according to claim 7, wherein said combustion variation detecting section detects a combustion variation by detecting at least one variation among a variation of the number of revolutions, a knocking variation, an air-fuel ratio variation, a cylinder internal pressure variation, an ion current variation, and an exhaust gas component variation, of said internal combustion engine.

9. The control device for an internal combustion engine according to claim 7, further comprising:

an operating condition-detecting section for detecting information about at least one factor among factors including a number of engine revolutions and a load of said internal combustion engine, a coolant temperature, an intake air temperature, and an elapsed time after engine start-up; and an operating condition-determining section for confirming a current operating condition of said internal combustion engine by determining that said information about said at least one factor detected in said operating condition-detecting section belongs to an operating condition among a plurality of operating conditions that have been prepared and classified in advance;

wherein said combustion variation manipulating section manipulates a combustion variation of said internal combustion engine for each current operating condition of said internal combustion engine determined by said operating condition-determining section based on said combustion variation manipulation amount.

* * * * *